US011787501B2

(12) United States Patent
Nakamura et al.

(10) Patent No.: US 11,787,501 B2
(45) Date of Patent: Oct. 17, 2023

(54) HUMAN-POWERED VEHICLE DETERMINATION DEVICE AND HUMAN-POWERED VEHICLE CONTROL DEVICE

(71) Applicant: Shimano Inc., Osaka (JP)

(72) Inventors: Jumpei Nakamura, Osaka (JP); Takuya Katsuki, Osaka (JP); Keiji Terashima, Osaka (JP); Yasuhiro Tsuchizawa, Osaka (JP); Hiroshi Matsuda, Osaka (JP)

(73) Assignee: Shimano Inc., Osaka (JP)

( * ) Notice: Subject to any disclaimer, the term of this patent is extended or adjusted under 35 U.S.C. 154(b) by 426 days.

(21) Appl. No.: 17/097,472

(22) Filed: Nov. 13, 2020

(65) Prior Publication Data

US 2021/0155314 A1 May 27, 2021

(30) Foreign Application Priority Data

Nov. 25, 2019 (JP) .................................. 2019-212500

(51) Int. Cl.
*B62M 6/50* (2010.01)
*B62M 6/45* (2010.01)
*B62M 6/80* (2010.01)
*B62J 50/22* (2020.01)

(52) U.S. Cl.
CPC ................ *B62M 6/50* (2013.01); *B62J 50/22* (2020.02); *B62M 6/45* (2013.01); *B62M 6/80* (2013.01)

(58) Field of Classification Search
CPC ... B62M 6/50; B62M 6/45; B62M 6/80; B62J 50/22; B62J 45/411; B62J 45/412; Y02T 10/72
See application file for complete search history.

(56) References Cited

U.S. PATENT DOCUMENTS

2020/0262510 A1* 8/2020 Hahn ....................... B62M 6/50

FOREIGN PATENT DOCUMENTS

| CN | 109969329 A | 7/2019 |
|---|---|---|
| CN | 110114265 A | 8/2019 |
| JP | 7-2164 A | 1/1995 |
| JP | 2016-7905 A | 1/2016 |
| JP | 5922586 B2 | 5/2016 |
| JP | 2019-166912 A | 10/2019 |

* cited by examiner

*Primary Examiner* — Brian P Sweeney
(74) *Attorney, Agent, or Firm* — Global IP Counselors, LLP

(57) ABSTRACT

A determination device is for a human-powered vehicle. The determination device includes a processor that is configured to obtain information related to a rotational speed of an input rotational shaft of the human-powered vehicle and information related to a rotational speed of a wheel of the human-powered vehicle to determine a predetermined state in accordance with a varied amount of the rotational speed of the input rotational shaft and a varied amount of the rotational speed of the wheel in a state in which a human driving force that is applied to the human-powered vehicle is greater than or equal to a predetermined threshold value.

25 Claims, 13 Drawing Sheets

HUMAN-POWERED VEHICLE DETERMINATION DEVICE AND HUMAN-POWERED VEHICLE CONTROL DEVICE

CROSS-REFERENCE TO RELATED APPLICATIONS

This application claims priority to Japanese Patent Application No. 2019-212500, filed on Nov. 25, 2019. The entire disclosure of Japanese Patent Application No. 2019-212500 is hereby incorporated herein by reference.

BACKGROUND

Technical Field

The present invention generally relates to a human-powered vehicle determination device and a human-powered vehicle control device.

Background Information

Japanese Laid-Open Patent Publication No. 2016-7905 (Patent Document 1) discloses an example of a human-powered vehicle including a detector that outputs information related to a rotational speed of a wheel of the human-powered vehicle.

SUMMARY

One object of the present disclosure is to provide a human-powered vehicle determination device and a human-powered vehicle control device that are used for a human-powered vehicle in a preferred manner.

A determination device in accordance with a first aspect of the present disclosure is for a human-powered vehicle. The determination device comprises a processor that is configured to obtain information related to a rotational speed of an input rotational shaft of the human-powered vehicle and information related to a rotational speed of a wheel of the human-powered vehicle to determine a predetermined state in accordance with a varied amount of the rotational speed of the input rotational shaft and a varied amount of the rotational speed of the wheel in a state in which a human driving force that is applied to the human-powered vehicle is greater than or equal to a predetermined threshold value.

The determination device according to the first aspect determines the predetermined state in accordance with the varied amount of the rotational speed of the input rotational shaft and the varied amount of the rotational speed of the wheel in a state where human driving force applied to the human-powered vehicle is greater than or equal to the predetermined threshold value. Thus, the determination device is used in the human-powered vehicle in a preferred manner.

In accordance with a second aspect of the present disclosure, in the determination device according to the first aspect, the processor is configured to determine the predetermined state upon determining the rotational speed of the wheel is greater than or equal to a predetermined first speed.

The determination device according to the second aspect determines the predetermined state upon determining the rotational speed of the wheel is greater than or equal to the predetermined first speed. This increases the accuracy of determination.

In accordance with a third aspect of the present disclosure, in the determination device according to the first or second aspect, the processor is configured to further obtain at least one of first information related to a first ratio of the rotational speed of the wheel to the rotational speed of the input rotational shaft and second information related to a second ratio of the rotational speed of the input rotational shaft to the rotational speed of the wheel to determine the predetermined state based on the varied amount of the rotational speed of the input rotational shaft, the varied amount of the rotational speed of the wheel, and at least one of the first ratio and the second ratio in a state in which the human driving force is greater than or equal to the predetermined threshold value.

The determination device according to the third aspect determines the predetermined state based on the varied amount of the rotational speed of the input rotational shaft, the varied amount of the rotational speed of the wheel, and at least one of the first ratio and the second ratio in a state where human driving force is greater than or equal to the predetermined threshold value.

In accordance with a fourth aspect of the present disclosure, in the determination device according to the third aspect, the processor is configured to determine the predetermined state in accordance with a comparison of a varied amount of a first value obtained by multiplying the rotational speed of the input rotational shaft by the first ratio with the varied amount of the rotational speed of the wheel or a comparison of the varied amount of the rotational speed of the input rotational shaft with a varied amount of a second value obtained by dividing the rotational speed of the wheel by the first ratio.

The determination device according to the fourth aspect determines the predetermined state in accordance with the comparison of the varied amount of the first value with the varied amount of the rotational speed of the wheel or the comparison of the varied amount of the rotational speed of the input rotational shaft with the varied amount of the second value.

In accordance with a fifth aspect of the present disclosure, in the determination device according to the fourth aspect, the processor is configured to determine that the predetermined state is a first state upon determining a difference of the varied amount of the first value and the varied amount of the rotational speed of the wheel is greater than or equal to a first difference or a difference of the varied amount of the rotational speed of the input rotational shaft and the varied amount of the second value is greater than or equal to a second difference.

The determination device according to the fifth aspect determines that the predetermined state is the first state upon determining the difference of the varied amount of the first value and the varied amount of the rotational speed of the wheel is greater than or equal to the first difference or the difference of the varied amount of the rotational speed of the input rotational shaft and the varied amount of the second value is greater than or equal to the second difference.

In accordance with a sixth aspect of the present disclosure, in the determination device according to the fourth or fifth aspect, the processor is configured to determine that the predetermined state is a second state upon determining a difference of the varied amount of the first value and the varied amount of the rotational speed of the wheel is less than a third difference or a difference of the varied amount of the rotational speed of the input rotational shaft and the varied amount of the second value is less than a fourth difference.

The determination device according to the sixth aspect determines that the predetermined state is the second state upon determining the difference of the varied amount of the first value and the varied amount of the rotational speed of the wheel is less than the third difference or the difference of the varied amount of the rotational speed of the input rotational shaft and the varied amount of the second value is less than the fourth difference.

In accordance with a seventh aspect of the present disclosure, in the determination device according to the fourth aspect, the processor is configured to determine the predetermined state in accordance with a comparison of a varied amount of a third value obtained by dividing the rotational speed of the input rotational shaft by the second ratio with the varied amount of the rotational speed of the wheel or a comparison of the varied amount of the rotational speed of the input rotational shaft with a varied amount of a fourth value obtained by multiplying the rotational speed of the wheel by the second ratio.

The determination device according to the seventh aspect determines the predetermined state in accordance with the comparison of the varied amount of the third value with the varied amount of the rotational speed of the wheel or the comparison of the varied amount of the rotational speed of the input rotational shaft with the varied amount of the fourth value obtained by multiplying the rotational speed of the wheel by the second ratio.

In accordance with an eighth aspect of the present disclosure, in the determination device according to the seventh aspect, the processor is configured to determine that the predetermined state is a first state upon determining a difference of the varied amount of the third value and the varied amount of the rotational speed of the wheel is greater than or equal to a fifth difference or a difference of the varied amount of the rotational speed of the input rotational shaft and the varied amount of the fourth value is greater than or equal to a sixth difference.

The determination device according to the eighth aspect determines that the predetermined state is the first state upon determining the difference of the varied amount of the third value and the varied amount of the rotational speed of the wheel is greater than or equal to the fifth difference or the difference of the varied amount of the rotational speed of the input rotational shaft and the varied amount of the fourth value is greater than or equal to the sixth difference.

In accordance with a ninth aspect of the present disclosure, in the determination device according to the seventh or eighth aspect, the processor is configured to determine that the predetermined state is a second state upon determining a difference of the varied amount of the third value and the varied amount of the rotational speed of the wheel is less than a seventh difference or a difference of the varied amount of the rotational speed of the input rotational shaft and the varied amount of the fourth value is less than an eighth difference.

The determination device according to the ninth aspect determines that the predetermined state is the second state upon determining the difference of the varied amount of the third value and the varied amount of the rotational speed of the wheel is less than the seventh difference or the difference of the varied amount of the rotational speed of the input rotational shaft and the varied amount of the fourth value is less than the eighth difference.

A determination device in accordance with a tenth aspect of the present disclosure is for a human-powered vehicle. The determination device comprises a processor that is configured to obtain information related to a rotational speed of an input rotational shaft of the human-powered vehicle and information related to a rotational speed of a wheel of the human-powered vehicle to determine a predetermined state in accordance with at least one of a first ratio of the rotational speed of the wheel to the rotational speed of the input rotational shaft and a second ratio of the rotational speed of the input rotational shaft to the rotational speed of the wheel.

The determination device according to the tenth aspect determines the predetermined state in accordance with at least one of the first ratio and the second ratio of the rotational speed of the input rotational shaft to the rotational speed of the wheel. Thus, the determination device is used for the human-powered vehicle in a preferred manner.

In accordance with an eleventh aspect of the present disclosure, in the determination device according to the tenth aspect, the processor is configured to determine the predetermined state in accordance with at least one of the first ratio and the second ratio in a state in which a human driving force that is applied to the human-powered vehicle is greater than or equal to a predetermined threshold value.

The determination device according to the eleventh aspect determines the predetermined state in accordance with at least one of the first ratio and the second ratio in a state where human driving force applied to the human-powered vehicle is greater than or equal to the predetermined threshold value.

In accordance with a twelfth aspect of the present disclosure, in the determination device according to the tenth or eleventh aspect, the processor is configured to determine that the predetermined state is a first state upon determining the first ratio is greater than or equal to a predetermined third ratio.

The determination device according to the twelfth aspect determines that the predetermined state is the first state upon determining the first ratio is greater than or equal to the predetermined third ratio.

In accordance with a thirteenth aspect of the present disclosure, in the determination device according to any one of the tenth to twelfth aspects, the processor is configured to determine that the predetermined state is a second state upon determining the first ratio is less than a predetermined fourth ratio.

The determination device according to the thirteenth aspect determines that the predetermined state is the second state upon determining the first ratio is less than the predetermined fourth ratio.

In accordance with a fourteenth aspect of the present disclosure, in the determination device according to the tenth or eleventh aspect, the processor is configured to determine that the predetermined state is a first state upon determining the second ratio is less than a predetermined fifth ratio.

The determination device according to the fourteenth aspect determines that the predetermined state is the first state upon determining the second ratio is less than the predetermined fifth ratio.

In accordance with a fifteenth aspect of the present disclosure, in the determination device according to any one of the tenth, eleventh, twelfth, and fourteenth aspects, the processor is configured to determine that the predetermined state is a second state upon determining the second ratio is greater than or equal to a predetermined sixth ratio.

The determination device according to the fifteenth aspect determines that the predetermined state is the second state upon determining the second ratio is greater than or equal to the predetermined sixth ratio.

In accordance with a sixteenth aspect of the present disclosure, in the determination device according to any one of the fifth, eighth, twelfth, and fourteenth aspects, the processor is configured to obtain the information related to the rotational speed of the wheel from a detector. The first state includes at least one of a state in which the detector is not configured by a predetermined detector and a state in which the detector is defective.

The determination device according to the sixteenth aspect determines the first state including at least one of a state in which the detector is not configured by the predetermined detector and a state in which the detector is defective.

In accordance with a seventeenth aspect of the present disclosure, in the determination device according to any one of the sixth, ninth, thirteenth, and fifteenth aspects, the processor is configured to obtain the information related to the rotational speed of the wheel from a detector. The second state includes a state in which the detector is configured by a predetermined detector.

The determination device according to the seventeenth aspect determines the second state including a state in which the detector is configured by the predetermined detector.

A control device in accordance with an eighteenth aspect of the present disclosure is for a human-powered vehicle. The control device comprises an electronic controller that is configured to obtain information related to a rotational speed of an input rotational shaft of the human-powered vehicle and information related to a rotational speed of a wheel of the human-powered vehicle to control a vehicle component of the human-powered vehicle in accordance with a varied amount of the rotational speed of the input rotational shaft and a varied amount of the rotational speed of the wheel in a state in which a human driving force that is applied to the human-powered vehicle is greater than or equal to a predetermined threshold value.

The control device according to the eighteenth aspect controls the vehicle component of the human-powered vehicle in accordance with the varied amount of the rotational speed of the input rotational shaft and the varied amount of the rotational speed of the wheel in a state where human driving force applied to the human-powered vehicle is greater than or equal to the predetermined threshold value. Thus, the control device is used for the human-powered vehicle in a preferred manner.

In accordance with a nineteenth aspect of the present disclosure, in the control device according to the eighteenth aspect, the electronic controller is configured to further obtain at least one of first information related to a first ratio of the rotational speed of the wheel to the rotational speed of the input rotational shaft and second information related to a second ratio of the rotational speed of the input rotational shaft to the rotational speed of the wheel to control the vehicle component in accordance with the varied amount of the rotational speed of the input rotational shaft, the varied amount of the rotational speed of the wheel, and at least one of the first ratio and the second ratio in a state in which the human driving force is greater than or equal to the predetermined threshold value.

The control device according to the nineteenth aspect controls the vehicle component in accordance with the varied amount of the rotational speed of the input rotational shaft, the varied amount of the rotational speed of the wheel, and at least one of the first ratio and the second ratio in a state where human driving force is greater than or equal to the predetermined threshold value.

In accordance with a twentieth aspect of the present disclosure, the control device according to the nineteenth aspect is configured so that the vehicle component includes a motor configured to apply a propulsion force to the human-powered vehicle. The electronic controller is configured to limit output of the motor upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

The control device according to the twentieth aspect limits output of the motor upon determining the difference of the varied amount of the first value and the varied amount of the rotational speed of the wheel is greater than or equal to the first difference or the difference of the varied amount of the rotational speed of the input rotational shaft and the varied amount of the second value is greater than or equal to the second difference.

In accordance with a twenty-first aspect of the present disclosure, the control device according to the nineteenth aspect is configured so that the vehicle component includes a motor configured to apply a propulsion force to the human-powered vehicle. The electronic controller is configured to decrease an assist ratio of an assist force that is produced by the motor to a human driving force that is input to the human-powered vehicle upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

The control device according to the twenty-first aspect decreases the assist ratio upon determining the difference of the varied amount of the first value and the varied amount of the rotational speed of the wheel is greater than or equal to the first difference or the difference of the varied amount of the rotational speed of the input rotational shaft and the varied amount of the second value is greater than or equal to the second difference.

In accordance with a twenty-second aspect of the present disclosure, the control device according to the nineteenth aspect is configured so that the vehicle component includes a motor configured to apply a propulsion force to the human-powered vehicle. The electronic controller is configured to stop the motor upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

The control device according to the twenty-second aspect stops the motor upon determining the difference of the varied amount of the first value and the varied amount of the rotational speed of the wheel is greater than or equal to the first difference or the difference of the varied amount of the rotational speed of the input rotational shaft and the varied amount of the second value is greater than or equal to the second difference.

In accordance with a twenty-third aspect of the present disclosure, the control device according to the nineteenth aspect is configured so that the vehicle component includes a motor configured to apply a propulsion force to the human-powered vehicle. The electronic controller is configured to limit output of the motor upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

The control device according to the twenty-third aspect limits output of the motor upon determining the difference of the varied amount of the third value and the varied amount of the rotational speed of the wheel is greater than or equal to the fifth difference or the difference of the varied amount of the rotational speed of the input rotational shaft and the varied amount of the fourth value is greater than or equal to the sixth difference.

In accordance with a twenty-fourth aspect of the present disclosure, the control device according to the nineteenth aspect is configured so that the vehicle component includes a motor configured to apply a propulsion force to the human-powered vehicle. The electronic controller is configured to decrease an assist ratio of an assist force that is produced by the motor to a human driving force that is input to the human-powered vehicle upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

The control device according to the twenty-fourth aspect decreases the assist ratio upon determining the difference of the varied amount of the third value and the varied amount of the rotational speed of the wheel is greater than or equal to the fifth difference or the difference of the varied amount of the rotational speed of the input rotational shaft and the varied amount of the fourth value is greater than or equal to the sixth difference.

In accordance with a twenty-fifth aspect of the present disclosure, the control device according to the nineteenth aspect is configured so that the vehicle component includes a motor configured to apply a propulsion force to the human-powered vehicle. The electronic controller is configured to stop the motor upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

The control device according to the twenty-fifth aspect stops the motor upon determining the difference of the varied amount of the third value and the varied amount of the rotational speed of the wheel is greater than or equal to the fifth difference or the difference of the varied amount of the rotational speed of the input rotational shaft and the varied amount of the fourth value is greater than or equal to the sixth difference.

In accordance with a twenty-sixth aspect of the present disclosure, the control device according to any one of the nineteenth to twenty-fifth aspects is configured so that the vehicle component includes a display. The electronic controller is configured to output information to the display to show predetermined display information on the display in accordance with a varied amount of the rotational speed of the input rotational shaft, a varied amount of the rotational speed of the wheel, and at least one of the first ratio and the second ratio in a state in which the human driving force is greater than or equal to the predetermined threshold value.

The control device according to the twenty-sixth aspect outputs information to the display to show the predetermined display information on the display in accordance with the varied amount of the rotational speed of the input rotational shaft, the varied amount of the rotational speed of the wheel, and at least one of the first ratio and the second ratio in a state where human driving force is greater than or equal to the predetermined threshold value.

The human-powered vehicle determination device and the human-powered vehicle control device according to the present disclosure are used for a human-powered vehicle in a preferred manner.

BRIEF DESCRIPTION OF THE DRAWINGS

Referring now to the attached drawings which form a part of this original disclosure.

DETAILED DESCRIPTION OF EMBODIMENTS DISCLOSURE

Figure 1:
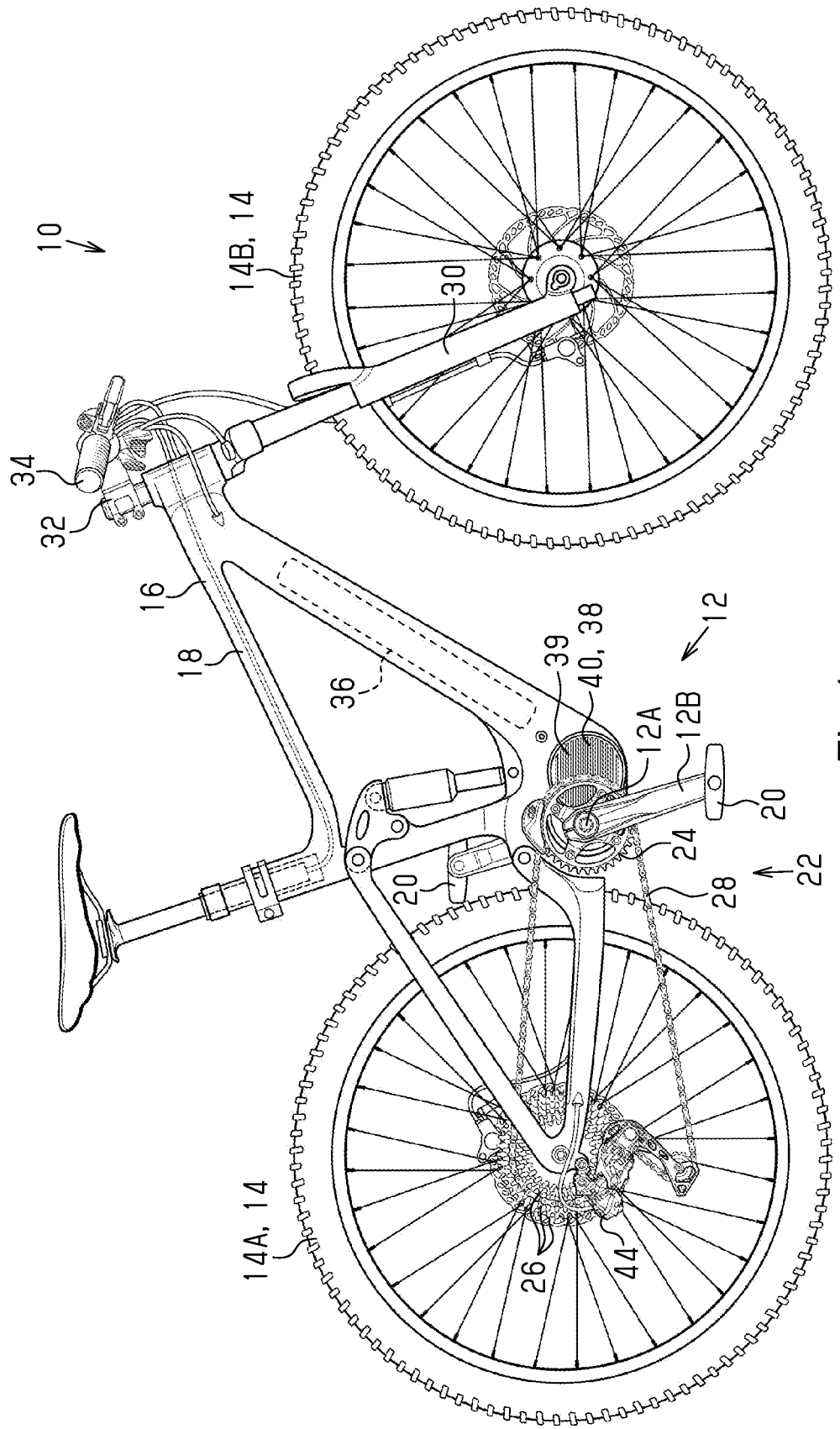
FIG. 1 is a side elevational view of a human-powered vehicle (e.g., a bicycle) including a human-powered vehicle control device in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a human-powered vehicle determination device 60 and a human-powered vehicle control device 70 will now be described with reference to FIGS. 1 to 4. A human-powered vehicle 10 is a conveyance including at least one wheel and driven by at least human driving force H. The human-powered vehicle 10 includes, for example, various types of bicycles such as a mountain bike, a road bike, a city bike, a cargo bike, a hand bike, and a recumbent bike. The number of wheels on the human-powered vehicle 10 is not limited. The human-powered vehicle 10 includes, for example, a monocycle and a conveyance including three or more wheels. The human-powered vehicle 10 is not limited to a conveyance configured to be driven by only the human driving force H. The human-powered vehicle 10 includes an E-bike that uses driving force of an electric motor for propulsion in addition to the human driving force H. The E-bike includes an electric assist bicycle that assists propulsion with an electric motor. In the embodiments, described below, the human-powered vehicle 10 refers to an electric assist bicycle.

The human-powered vehicle 10 includes a crank 12 into which the human driving force H is input. The human-powered vehicle 10 further includes a wheel 14 and a vehicle body 16. The wheel 14 includes a rear wheel 14A and a front wheel 14B. The vehicle body 16 includes a frame 18. The crank 12 includes an input rotational shaft 12A (a crank axle) that is rotatably supported by the frame 18, and two crank arms 12B respectively provided on opposite axial ends of the input rotational shaft 12A. Two pedals 20 are respectively coupled to the two crank arms 12B. The rear wheel 14A is driven in accordance with rotation of the crank 12. The rear wheel 14A is supported by the frame 18. The crank 12 and the rear wheel 14A are linked by a drive mechanism 22. The drive mechanism 22 includes a first rotary body 24 coupled to the input rotational shaft 12A. The input rotational shaft 12A and the first rotary body 24 can be coupled so as to rotate integrally with each other or can be coupled via a first one-way clutch. The first one-way clutch is configured to rotate the first rotary body 24 forward in the case where the crank 12 rotates forward, and is configured to allow the first rotary body 24 to rotate relative to the crank 12 in the case where the crank 12 rotates rearward. The first rotary body 24 includes a sprocket, a pulley, or a bevel gear. The drive mechanism 22 further includes a second rotary body 26 and a linking member 28. The linking member 28 transmits rotational force of the first rotary body 24 to the second rotary body 26. The linking member 28 includes, for example, a chain, a belt, or a shaft.

The second rotary body 26 is coupled to the rear wheel 14A. The second rotary body 26 includes a sprocket, a pulley, or a bevel gear. Preferably, a second one-way clutch is provided between the second rotary body 26 and the rear wheel 14A. The second one-way clutch is configured to rotate the rear wheel 14A forward in the case where the second rotary body 26 rotates forward, and is configured to allow the rear wheel 14A to rotate relative to the second rotary body 26 in the case where the second rotary body 26 rotates rearward.

The front wheel 14B is attached to the frame 18 by a front fork 30. A handlebar 34 is coupled to the front fork 30 by a stem 32. In the present embodiment, the rear wheel 14A is coupled to the crank 12 by the drive mechanism 22. However, at least one of the rear wheel 14A and the front wheel 14B can be coupled to the crank 12 by the drive mechanism 22.

The human-powered vehicle 10 further includes a human-powered vehicle battery 36. The battery 36 includes one or more battery elements. The battery elements include a rechargeable battery. The battery 36 supplies electric power to the control device 70. Preferably, the battery 36 is connected to an electronic controller 72 of the control device 70 by an electric cable or a wireless communication device to communicate with the electronic controller 72. The battery 36 is configured to communicate with the controller 72 of the control device 70 through, for example, power line communication (PLC), a controller area network (CAN), or a universal asynchronous receiver/transmitter (UART).

The human-powered vehicle 10 further includes a human-powered vehicle component 38 (hereinafter referred to as "the vehicle component 38"). Preferably, the vehicle component 38 includes a motor 40 configured to apply a propulsion force to the human-powered vehicle 10. The motor 40 includes one or more electric motors. The motor 40 is configured to transmit rotation to at least one of the front wheel 14B and a power transmission path of the human driving force H extending from the pedals 20 to the rear wheel 14A. The power transmission path of the human driving force H extending from the pedals 20 to the rear wheel 14A includes the rear wheel 14A. In the present embodiment, the motor 40 is provided on the frame 18 of the human-powered vehicle 10, and is configured to transmit rotation to the first rotary body 24. The vehicle component 38 includes a housing 39. The housing 39 is provided on the frame 18. The housing 39 is, for example, detachably attached to the frame 18. The motor 40 is provided on the housing 39. A drive unit is configured to include the motor 40 and the housing on which the motor 40 is provided. Preferably, a third one-way clutch is provided on the power transmission path between the motor 40 and the input rotational shaft 12A so that in the case where the input rotational shaft 12A is rotated in a direction in which the human-powered vehicle 10 travels forward, the rotational force of the crank 12 will not be transmitted to the motor 40. In the case where the motor 40 is provided on at least one of the rear wheel 14A and the front wheel 14B, the motor 40 can include a hub motor.

The vehicle component 38 can include a notification device such as a display 42. The display 42 includes, for example, a display panel. The display 42 includes, for example, at least one of a portable electronic device, a display unit, a smartphone, a tablet computer, and a cycle computer. The display 42 can include a speaker.

Preferably, the human-powered vehicle 10 includes a transmission 44 configured to change a transmission ratio of the human-powered vehicle 10. The transmission ratio of the human-powered vehicle 10 is a first ratio R1 of a rotational speed W of the wheel 14 to a rotational speed C of the input rotational shaft 12A. The first ratio R1 is the rotational speed W/the rotational speed C. In the present embodiment, the rear wheel 14A is a drive wheel. The transmission 44 includes, for example, at least one of a front derailleur, a rear derailleur, and an internal transmission device. In a case in which the transmission 44 includes an internal transmission device, the internal transmission device is provided, for example, on the hub of the rear wheel 14A. The internal transmission device can be provided, for example, on the housing 39. The transmission 44 includes at least one of an electric transmission configured to be actuated by an electric actuator and a cable-type transmission configured to be actuated by a Bowden cable.

The determination device 60 includes a determination unit 62. The control device 70 includes the electronic controller 72. Preferably, the electronic controller 72 includes the determination unit 62. The control device 70 and the determination device 60 can at least partially overlap with each other or can be substantially the same. In the present embodiment, the electronic controller 72 includes the determination unit 62.

Figure 2:
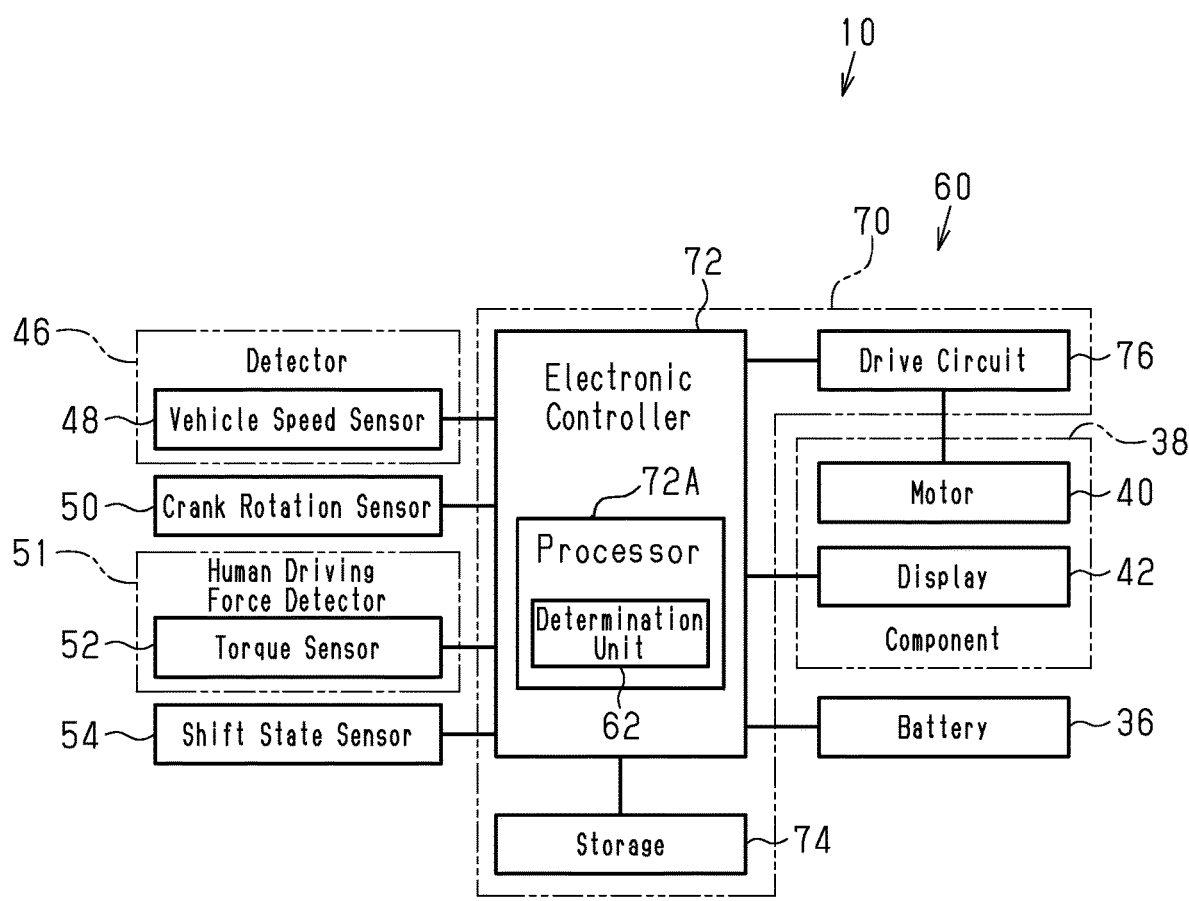
FIG. 2 is a block diagram showing an electrical configuration of the human-powered vehicle including the human-powered vehicle control device of the first embodiment.

The electronic controller 72 includes at least one processor 72A that execute that executes a predetermined control program. The term "electronic controller" as used herein refers to hardware that executes a software program, and does not include a human. For the sake of brevity, the electronic controller 72 shall hereinafter be simply referred to as "the controller 72". The processor 72A includes, for example, an arithmetic processing unit. The processor 72A can be, for example, a central processing unit (CPU) or a micro processing unit (MPU) of the controller 72. While only one processor is illustrated in FIG. 2, it will be apparent from this disclosure that several processors can be used. When several processors are used, the processors can be provided at different positions that are separate from each other. The controller 72 can include one or more microcomputers. Preferably, the control device 70 further includes storage 74. The storage 74 stores various control programs and information used for various control processes. The storage 74 includes any computer storage device or any non-transitory computer-readable medium with the sole exception of a transitory, propagating signal. For example, the storage 74 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM). The controller 72 functions as the determination unit 62 as the processor 72A executes a control program for functioning as the determination unit 62. Thus, here, the determination unit 62 is a part of the processor 72A of the controller 72.

Preferably, the control device 70 further includes a drive circuit 76 of the motor 40. Preferably, the drive circuit 76 and the controller 72 are provided on the housing 39. The drive circuit 76 and the controller 72 can be provided, for example, on the same circuit substrate. The drive circuit 76 includes an inverter circuit. The drive circuit 76 controls electric power supplied from the battery 36 to the motor 40. The drive circuit 76 is connected to the controller 72 by a wire or wireless connection. The drive circuit 76 drives the motor 40 in accordance with a control signal from the controller 72.

The human-powered vehicle 10 further includes a detector 46. The term "detector" as used herein refers to a hardware device or instrument designed to detect the presence of a particular object or substance and to emit a signal in response. The term "detector" as used herein do not include a human. The detector 46 is configured to detect information related to the rotational speed W of the wheel 14. The detector 46 is connected to the controller 72 via a wireless communication device or an electric cable. Preferably, the detector 46 includes a vehicle speed sensor 48. The term "sensor" as used herein also refers to a hardware device or instrument designed to detect the presence of a particular object or substance and to emit a signal in response. The term "sensor" as used herein also do not include a human.

The vehicle speed sensor 48 is configured to detect information corresponding to the rotational speed W of the wheel 14 of the human-powered vehicle 10. The vehicle speed sensor 48 is configured to detect, for example, a magnet provided on the wheel 14 of the human-powered vehicle 10. The vehicle speed sensor 48 is configured to, for example, output a detection signal a predetermined number of times in one rotation of the wheel 14. The predetermined number of times is, for example, one. The vehicle speed sensor 48 outputs a signal corresponding to the rotational speed of the wheel 14. The controller 72 calculates a vehicle speed V of the human-powered vehicle 10 based on the rotational speed of the wheel 14 and information related to the perimeter of the wheel 14. The storage 74 stores information related to the perimeter of the wheel 14. The vehicle speed sensor 48 includes, for example, a magnetic reed forming a reed switch or a Hall element. The vehicle speed sensor 48 can be attached to a chainstay of the frame 18 of the human-powered vehicle 10 and configured to detect a magnet mounted on the rear wheel 14A, or can be provided on the front fork 30 and configured to detect a magnet attached to the front wheel 14B. In the present embodiment, the vehicle speed sensor 48 is configured so that the reed switch detects the magnet once in one rotation of the wheel 14. The vehicle speed sensor 48 is not limited to a configuration that detects a magnet provided on the wheel 14 and can be configured to include, for example, an optical sensor. The vehicle speed sensor 48 is connected to the controller 72 via a wireless communication device or an electric cable.

In a case where the vehicle component 38 includes the motor 40, it is preferred that the human-powered vehicle 10 further includes a crank rotational sensor 50 and a torque sensor 52. The crank rotational sensor 50 is configured to detect information corresponding to the rotational speed C of the input rotational shaft 12A. The crank rotational sensor 50 is provided, for example, on the frame 18 or the drive unit of the human-powered vehicle 10. The crank rotation sensor 50 is configured to include a magnetic sensor that outputs a signal corresponding to the strength of the magnetic field. An annular magnet having a magnetic field, the strength of which changes in the circumferential direction, is provided on the input rotational shaft 12A, a member that rotates in cooperation with the input rotational shaft 12A, or the power transmission path between the input rotational shaft 12A and the first rotary body 24. The member that rotates in cooperation with the input rotational shaft 12A can include the output shaft of the motor 40. The crank rotation sensor 50 outputs a signal corresponding to the rotational speed C of the input rotational shaft 12A. The magnet can be provided on a member that rotates integrally with the input rotational shaft 12A in the power transmission path of the human driving force H between the input rotational shaft 12A and the first rotary body 24. For example, in a case where the first one-way clutch is not provided between the input rotational shaft 12A and the first rotary body 24, the magnet can be provided on the first rotary body 24. The crank rotation sensor 50 can include, for example, an optical sensor, an acceleration sensor, a gyro sensor, or a torque sensor instead of the magnetic sensor. The crank rotational sensor 50 is connected to the controller 72 via a wireless communication device or an electric cable.

Preferably, the human-powered vehicle 10 further includes a human driving force detector 51. The human driving force detector 51 includes the torque sensor 52. The torque sensor 52 is configured to output a signal corresponding to torque applied to the crank 12 by the human driving force H. For example, in a case where the first one-way clutch is provided on the power transmission path, it is preferred that the torque sensor 52 is provided at the upstream side of the first one-way clutch in the power transmission path. The torque sensor 52 includes, for example, a strain sensor, a magnetostrictive sensor, or a pressure sensor. The strain sensor includes a strain gauge. The torque sensor 52 is provided on the power transmission path. Alternatively, the torque sensor 52 is provided on a member included in a vicinal member of a member included in the power transmission path. The member included in the power transmission path includes, for example, the input rotational shaft 12A, a member that transmits the human driving force H between the input rotational shaft 12A and the first rotary body 24, the crank arms 12B, and the pedals 20. The torque sensor 52 is connected to the controller 72 via a wireless communication device or an electric cable. The human driving force detector 51 can have any configuration that obtains information related to the human driving force H and can include, for example, a sensor that detects pressure applied to the pedals or a sensor that detects tension of a chain.

Preferably, the human-powered vehicle 10 further includes a shift state sensor 54. The shift state sensor 54 outputs information related to a shift state of the transmission 44. The shift state includes, for example, a shift stage. The shift state sensor 54 can be provided on the transmission 44 or can be provided on a Bowden cable or a transmission operating device. In a case where the transmission 44 is an electric transmission, the shift state sensor 54 is configured to, for example, detect an action of an electric actuator of the electric transmission. The electric actuator of the electric transmission includes, for example, an electric motor and a speed reducer. The shift state sensor 54 is configured to detect an action of the electric motor or the speed reducer of the electric actuator. In a case where the transmission 44 is a cable-type transmission, the shift state sensor 54 is configured to, for example, detect at least one of an action of a movable portion of the transmission 44, an action of the Bowden cable, and an action of the transmission operating device. The shift state sensor 54 is configured to include, for example, a magnetic sensor, a potentiometer, a rotary encoder, a linear encoder, or an optical sensor. The storage 74 stores information related to the shift state output from the shift state sensor 54 in association with information related to the transmission ratio of the human-powered vehicle. The controller 72 obtains information related to the present first ratio R1 of the human-powered vehicle 10 based on the information related to the shift state output from the shift state sensor 54 and information stored in the storage 74.

The determination device 60 includes the determination unit 62. The determination unit 62 obtains information related to the rotational speed C of the input rotational shaft 12A of the human-powered vehicle 10 and information related to the rotational speed W of the wheel 14 of the human-powered vehicle 10. In a state where the human driving force H applied to the human-powered vehicle 10 is greater than or equal to a predetermined threshold value HX, the determination unit 62 is configured to determine a predetermined state in accordance with a varied amount of the rotational speed C of the input rotational shaft 12A and a varied amount of the rotational speed W of the wheel 14. Preferably, the determination unit 62 is configured to obtain information related to the rotational speed W of the wheel 14 from the detector 46. Preferably, the predetermined threshold value HX is greater than 0 Nm. Preferably, the predetermined threshold value HX is set to a value allowing for determination of coasting of the human-powered vehicle 10. The predetermined threshold value HX is, for example, in a range greater than 0 Nm and less than or equal to 8 Nm. The predetermined threshold value HX is, for example, in a range greater than 3 Nm and less than or equal to 6 Nm. The varied amount is, for example, an amount that is varied in a predetermined time. The predetermined time is, for example, one second.

Preferably, the determination unit 62 is configured to determine the predetermined state upon determining the rotational speed W of the wheel 14 is greater than or equal to a predetermined first speed WX. The predetermined first speed WX includes, for example, a value corresponding to a case where the vehicle speed V of the human-powered vehicle 10 is 25 km per hour or close to 25 km per hour. The predetermined first speed WX can include, for example, a value corresponding to a case where the vehicle speed V of the human-powered vehicle 10 is 24 km per hour or close to 24 km per hour.

Preferably, the determination unit 62 further obtains at least one of first information related to the first ratio R1 of the rotational speed W of the wheel 14 to the rotational speed C of the input rotational shaft 12A and second information related to a second ratio R2 of the rotational speed C of the input rotational shaft 12A to the rotational speed W of the wheel 14. The second ratio R2 is the rotational speed C/the rotational speed W. Preferably, the determination unit 62 is configured to determine the predetermined state based on the varied amount of the rotational speed C of the input rotational shaft 12A, the varied amount of the rotational speed W of the wheel 14, and at least one of the first ratio R1 and the second ratio R2 in a state where the human driving force H is greater than or equal to the predetermined threshold value HX. Preferably, the determination unit 62 is configured to determine the predetermined state in accordance with a comparison of a varied amount of a first value P1 obtained by multiplying the rotational speed C of the input rotational shaft 12A by the first ratio R1 with the varied amount of the rotational speed W of the wheel 14 or a comparison of the varied amount of the rotational speed C of the input rotational shaft 12A with a varied amount of a second value P2 obtained by dividing the rotational speed W of the wheel 14 by the first ratio R1.

Preferably, the predetermined state includes a first state and a second state. For example, the first state includes at least one of a state in which the detector 46 is not configured by a predetermined detector and a state in which the detector 46 is defective. The second state includes a state in which the detector 46 is configured by the predetermined detector. The predetermined detector is configured to be appropriately used to control the vehicle component 38. In a case where the detector 46 is not configured by the predetermined detector, the actual variation of the rotational speed W of the wheel 14 can differ from variation of the rotational speed W of the wheel 14 determined by a detection result of the detector 46. The determination unit 62 determines that a case where the detector 46 is not appropriate for controlling the vehicle component 38 is the first state.

Preferably, the determination unit 62 is configured to determine that the predetermined state is the first state upon determining a difference of the varied amount of the first value P1 and the varied amount of the rotational speed W of the wheel 14 is greater than or equal to a first difference D1 or a difference of the varied amount of the rotational speed C of the input rotational shaft 12A and the varied amount of the second value P2 is greater than or equal to a second difference D2. Preferably, the determination unit 62 is configured to determine that the predetermined state is the second state upon determining a difference of the varied amount of the first value P1 and the varied amount of the rotational speed W of the wheel 14 is less than a third difference D3 or a difference of the varied amount of the rotational speed C of the input rotational shaft 12A and the varied amount of the second value P2 is less than a fourth difference D4.

Preferably, the first difference D1 is greater than the third difference D3. The first difference D1 can be equal to the third difference D3. Preferably, the second difference D2 is greater than the fourth difference D4. The second difference D2 can be equal to the fourth difference D4. The first difference D1, the second difference D2, the third difference D3, and the fourth difference D4 are determined in advance. Information related to at least one of the first difference D1, the second difference D2, the third difference D3, and the fourth difference D4 is stored in the storage 74.

Preferably, the controller 72 is configured to output information to the display 42 to show predetermined display information on the display 42 in accordance with the varied amount of the rotational speed C of the input rotational shaft 12A, the varied amount of the rotational speed W of the wheel 14, and at least one of the first ratio R1 and the second ratio R2 in a state where the human driving force H is greater than or equal to the predetermined threshold value HX.

Preferably, in the second state, the controller 72 causes the display 42 to notify predetermined notification information. The predetermined notification information, for example, indicates an error of the detector 46. In a case where the display 42 includes a display, the predetermined notification information includes, for example, at least one of a letter and an image. In a case where the display 42 includes a speaker, the predetermined notification information includes, for example, at least one of a voice and an alert sound. In the first state, the display 42 can be configured to, for example, continuously or intermittently issue the notification until the state becomes the second state.

A process for determining the first state and the second state will now be described with reference to FIG. 3. In a case in which electric power is supplied to the controller 72, the controller 72 starts the process and proceeds to step S11 of the flowchart shown in FIG. 3. In a case in which the flowchart shown in FIG. 3 ends, the controller 72 repeats the process from step S11 after a predetermined interval until the supply of electric power is stopped.

In step S11, the controller 72 determines whether the human driving force H is greater than or equal to the predetermined threshold value HX. Upon determining the human driving force H is not greater than or equal to the predetermined threshold value HX, the controller 72 ends the process. Upon determining the human driving force H is greater than or equal to the predetermined threshold value HX, the controller 72 proceeds to step S12.

In step S12, the controller 72 determines whether the rotational speed W of the wheel 14 is greater than or equal to the predetermined first speed WX. Upon determining the rotational speed W of the wheel 14 is not greater than or equal to the predetermined first speed WX, the controller 72 ends the process. Upon determining the rotational speed W of the wheel 14 is greater than or equal to the predetermined first speed WX, the controller 72 proceeds to step S13.

In step S13, the controller 72 determines whether the difference of the varied amount of the first value P1 and the varied amount of the rotational speed W of the wheel 14 is greater than or equal to the first difference D1 or the difference of the varied amount of the rotational speed C of the input rotational shaft 12A and the varied amount of the second value P2 is greater than or equal to the second difference D2. Upon determining the difference of the varied amount of the first value P1 and the varied amount of the rotational speed W of the wheel 14 is greater than or equal to the first difference D1 or the difference of the varied amount of the rotational speed C of the input rotational shaft 12A and the varied amount of the second value P2 is greater than or equal to the second difference D2, the controller 72 proceeds to step S14. The controller 72 determines that the predetermined state is the first state in step S14 and proceeds to step S17.

In step S13, upon determining the difference of the varied amount of the first value P1 and the varied amount of the rotational speed W of the wheel 14 is not greater than or equal to the first difference D1 and the difference of the varied amount of the rotational speed C of the input rotational shaft 12A and the varied amount of the second value P2 is not greater than or equal to the second difference D2, the controller 72 proceeds to step S15. In step S15, the controller 72 determines whether the difference of the varied amount of the first value P1 and the varied amount of the rotational speed W of the wheel 14 is less than the third difference D3 or the difference of the varied amount of the rotational speed C of the input rotational shaft 12A and the varied amount of the second value P2 is less than the fourth difference D4. Upon determining the difference of the varied amount of the first value P1 and the varied amount of the rotational speed W of the wheel 14 is not less than the third difference D3 and the difference of the varied amount of the rotational speed C of the input rotational shaft 12A and the varied amount of the second value P2 is not less than the fourth difference D4, the controller 72 ends the process. Upon determining the difference of the varied amount of the first value P1 and the varied amount of the rotational speed W of the wheel 14 is less than the third difference D3 or the difference of the varied amount of the rotational speed C of the input rotational shaft 12A and the varied amount of the second value P2 is less than the fourth difference D4, the controller 72 proceeds to step S16. In step S16, the controller 72 determines that the predetermined state is the second state and proceeds to step S17.

In step S17, the controller 72 outputs information to the display 42 to show the predetermined display information and ends the process. In a case where it is determined in step S14 that the predetermined state is the first state, the controller 72 outputs information including an indication of the first state to the display 42, and the display 42 shows the predetermined display information corresponding to the first state. In a case where it is determined in step S16 that the predetermined state is the second state, the controller 72 outputs information including an indication of the second state to the display 42, and the display 42 shows the predetermined display information corresponding to the second state.

In step S13, in a case where it is determined that the difference of the varied amount of the first value P1 and the varied amount of the rotational speed W of the wheel 14 is greater than or equal to the first difference D1, the controller 72 can proceed to step S14. Upon determining the difference of the varied amount of the first value P1 and the varied amount of the rotational speed W of the wheel 14 is not greater than or equal to the first difference D1, the controller 72 can proceed to step S15. In step S13, upon determining that the difference of the varied amount of the rotational speed C of the input rotational shaft 12A and the varied amount of the second value P2 is greater than or equal to the second difference D2, the controller 72 can proceed to step S14. Upon determining that the difference of the varied amount of the rotational speed C of the input rotational shaft 12A and the varied amount of the second value P2 is not greater than or equal to the second difference D2, the controller 72 can proceed to step S15.

In step S15, in a case where the difference of the varied amount of the first value P1 and the varied amount of the rotational speed W of the wheel 14 is less than the third difference D3, the controller 72 can proceed to step S16. In a case where the difference of the varied amount of the first value P1 and the varied amount of the rotational speed W of the wheel 14 is not less than the third difference D3, the controller 72 can end the process. In step S15, in a case where the difference of the varied amount of the rotational speed C of the input rotational shaft 12A and the varied amount of the second value P2 is less than the fourth difference D4, the controller 72 can proceed to step S16. In a case where the difference of the varied amount of the rotational speed C of the input rotational shaft 12A and the varied amount of the second value P2 is not less than the fourth difference D4, the controller 72 can end the process.

Preferably, in a state in which the human driving force H applied to the human-powered vehicle 10 is greater than or equal to the predetermined threshold value HX, the controller 72 is configured to control the vehicle component 38 of the human-powered vehicle 10 in accordance with the varied amount of the rotational speed C of the input rotational shaft 12A and the varied amount of the rotational speed W of the wheel 14.

The controller 72 controls the vehicle component 38 in accordance with an output of the detector 46. In a case where the vehicle component 38 is the motor 40, the controller 72 controls the motor 40 in accordance with the output of the detector 46. Preferably, in a case where the vehicle component 38 is the motor 40, the controller 72 controls the motor 40 in accordance with outputs of the detector 46, the crank rotational sensor 50, and the torque sensor 52.

The controller 72 controls the motor 40, for example, in accordance with at least one of the vehicle speed V of the human-powered vehicle 10 and the rotational speed C of the input rotational shaft 12A. Preferably, the controller 72 further controls the motor 40 in accordance with the human driving force H. The controller 72 can be configured to control the motor 40 in an assist mode and a walk mode. In the walk mode, the controller 72 is configured to drive the motor 40 in a case where the human driving force H input to the crank 12 is less than or equal to a predetermined driving force HA. The predetermined driving force HA is, for example, 0 Nm. The walk mode is used, for example, in a case where the user walks the human-powered vehicle 10. In the walk mode, the controller 72 is configured to drive the motor 40 in a case where the user is operating an operating portion for driving the motor 40 and the human driving force H is less than or equal to a predetermined first driving force HA1. The predetermined first driving force HA1 is, for example, 0 Nm. In the assist mode, the controller 72 is configured to control the motor 40 in accordance with the human driving force H and drive the motor 40 upon determining the human driving force H is greater than a predetermined second driving force HA2. The human driving force H can be expressed in torque HT or power WH. The predetermined second driving force HA2 is, for example, 5 Nm. In a case where the human driving force H is expressed in power, the human driving force H is obtained by multiplying torque detected by the torque sensor 52 and the rotational speed C of the input rotational shaft 12A detected by the crank rotational sensor 50.

The controller 72 is configured to control the motor 40, for example, so that a ratio of an assist force M produced by the motor 40 to the human driving force H equals a predetermined assist ratio X. The predetermined assist ratio X does not have to be constant and can be changed in accordance with, for example, the human driving force H, the vehicle speed V, or both the human driving force H and the vehicle speed V. The human driving force H and the assist force M can be expressed in torque or power. In a case where the human driving force H and the assist force M are expressed in torque, the human driving force H is referred to as human torque TH, and the assist force M is referred to as an assist torque TM. In a case where the human driving force H and the assist force M are expressed in power, the human driving force H is referred to as a human power WH, and the assist force M is referred to as an assist power WM. In the human-powered vehicle 10, a torque ratio of the assist torque TM to the human torque TH can be referred to as an assist ratio AT. The ratio of the assist power WM produced by the motor 40 to the human power WH can be referred to as an assist ratio AW. The controller 72 is configured to control the motor 40, for example, in a control state selected from multiple control states that at least partially differ from each other in the correspondence relationship between the human driving force H and the assist ratio X. The human power WH is calculated by multiplying the human torque TH and the rotational speed C of the input rotational shaft 12A. In a case where the output of the motor 40 is input to a power transmission path of the human driving force H through a speed reducer, the output of the speed reducer is used as the assist force M. In a case where the speed reducer is not provided, the assist power WM is calculated by multiplying output torque of the motor 40 and rotational speed of the motor 40. In a case where the speed reducer is provided, the assist power WM is calculated by multiplying output torque of the speed reducer and output rotational speed of the speed reducer. In a case where the speed reducer is provided, the storage 74 is configured to store information related to a reduction ratio of the speed reducer. The controller 72 calculates the output rotational speed of the speed reducer in accordance with the rotational speed of the motor 40 and information related to the reduction ratio of the speed reducer. The storage 74 stores, for example, information indicating the relationship between a control instruction of the motor 40 and an output torque of the motor 40. The controller 72 calculates an output torque of the motor 40 in accordance with, for example, the information indicating the relationship between the control instruction of the motor 40 and the output torque of the motor 40 stored in the storage 74. The controller 72 calculates, for example, an output torque of the speed reducer in accordance with the output torque of the motor 40 and information related to the reduction ratio of the speed reducer. The controller 72 is configured to output the control instruction to the drive circuit 76 of the motor 40 in accordance with the human torque TH or the human power WH. The control instruction includes, for example, a torque instruction value. The multiple control states can include a control state in which the motor 40 is not driven.

The controller 72 controls the motor 40 so that the assist force M becomes less than or equal to an upper limit value MX. In a case where the assist force M is expressed in torque, the controller 72 controls the motor 40 so that the assist torque TM becomes less than or equal to an upper limit value MTX. Preferably, the upper limit value MTX is in a range that is greater than or equal to 30 Nm and less than or equal to 90 Nm. The upper limit value MTX is, for example, 80 Nm. The upper limit value MTX is specified, for example, by an output property of the motor 40. In a case where the assist force M is expressed in power, the controller 72 controls the motor 40 so that the assist power WM becomes less than or equal to an upper limit value MWX.

For example, upon determining the vehicle speed V is greater than or equal to a predetermined the vehicle speed VX, the controller 72 stops the motor 40. The predetermined vehicle speed VX is, for example, 25 km per hour. The predetermined vehicle speed VX can be less than 25 km per hour and can be, for example, 24 km per hour. The predetermined vehicle speed VX can be greater than 25 km per hour and can be, for example, 45 km per hour. Preferably, the predetermined first speed WX is equal to the rotational speed W of the wheel 14 corresponding to the predetermined vehicle speed VX or less than the rotational speed W of the wheel 14 corresponding to the predetermined vehicle speed VX. The determination unit 62 is configured to determine the predetermined state in a case where the rotational speed W of the wheel 14 is greater than or equal to the predetermined first speed WX. Even in a case where the actual vehicle speed V is greater than the predetermined vehicle speed VX, the detector 46 can transmit an output that does not exceed the predetermined vehicle speed VX to the controller 72. In such a case, the above configuration appropriately determines that the predetermined state is the first state, in which the detector 46 is not configured by the predetermined detector, as long as the predetermined first speed WX is less than or equal to the rotational speed W of the wheel 14 corresponding to the predetermined vehicle speed VX.

For example, upon determining the rotational speed C of the input rotational shaft 12A is less than or equal to a predetermined first rotational speed C1, the controller 72 stops the motor 40. The predetermined first rotational speed C1 is, for example, 0 rpm. For example, upon determining the rotational speed C of the input rotational shaft 12A is greater than or equal to a predetermined second rotational speed C2, the controller 72 can stop the motor 40 or control the motor 40 to decrease the assist force M.

In the first state, the controller 72 can, for example, limit output of the motor 40 more than in the second state, can decrease the assist ratio X more than in the second state, or can stop the motor 40.

The process for controlling the motor 40 in the first state will now be described with reference to FIG. 4. In a case in which electric power is supplied to the controller 72, the controller 72 starts the process and proceeds to step S21 of the flowchart shown in FIG. 4. In a case in which the flowchart shown in FIG. 4 ends, the controller 72 repeats the process from step S21 after a predetermined interval until the supply of electric power is stopped.

In step S21, the controller 72 determines whether the predetermined state is the first state. Upon determining the predetermined state is not the first state, the controller 72 ends the process. Upon determining the predetermined state is the first state, the controller 72 proceeds to step S22. In step S22, the controller 72 executes control of the motor 40 corresponding to the first state and ends the process.

Second Embodiment

A second embodiment of a control device 70 will now be described with reference to FIGS. 2 and 5. The control device 70 of the second embodiment is the same as the control device 70 of the first embodiment except the process of determining the first state and the second state. Thus, the same reference characters are given to those components that are the same as the corresponding components of the first embodiment. Such components will not be described in detail.

The determination unit 62 is configured to determine the predetermined state in accordance with a comparison of a varied amount of a third value P3 obtained by dividing the rotational speed C of the input rotational shaft 12A by the second ratio R2 and a varied amount of the rotational speed W of the wheel 14 or a comparison of the varied amount of the rotational speed C of the input rotational shaft 12A and a varied amount of a fourth value P4 obtained by multiplying the rotational speed W of the wheel 14 by the second ratio R2.

Preferably, the determination unit 62 is configured to determine that the predetermined state is the first state upon determining a difference of the varied amount of the third value P3 and the varied amount of the rotational speed W of the wheel 14 is greater than or equal to a fifth difference D5 or a difference of the varied amount of the rotational speed C of the input rotational shaft 12A and a varied amount of the fourth value P4 is greater than or equal to a sixth difference D6. Preferably, the determination unit 62 is configured to determine that the predetermined state is the second state upon determining the difference of the varied amount of the third value P3 and the varied amount of the rotational speed W of the wheel 14 is less than a seventh difference D7 or a difference of the varied amount of the rotational speed C of the input rotational shaft 12A and the varied amount of the fourth value P4 is less than an eighth difference D8.

Preferably, the fifth difference D5 is greater than the seventh difference D7. The fifth difference D5 can be equal to the seventh difference D7. Preferably, the sixth difference D6 is greater than the eighth difference D8. The sixth difference D6 can be equal to the eighth difference D8. The fifth difference D5, the sixth difference D6, the seventh difference D7, and the eighth difference D8 are determined in advance. Information related to at least one of the fifth difference D5, the sixth difference D6, the seventh difference D7, and the eighth difference D8 is stored in the storage 74.

A process for determining the first state and the second state will now be described with reference to FIG. 5. In a case in which electric power is supplied to the controller 72, the controller 72 starts the process and proceeds to step S11 of the flowchart shown in FIG. 5. In a case in which the flowchart shown in FIG. 5 ends, the controller 72 repeats the process from step S11 after a predetermined interval until the supply of electric power is stopped. Steps S11, S12, S14, and S17 in FIG. 5 correspond to steps S11, S12, S14, and S17 in FIG. 3. The same steps will not be described.

Figure 3:
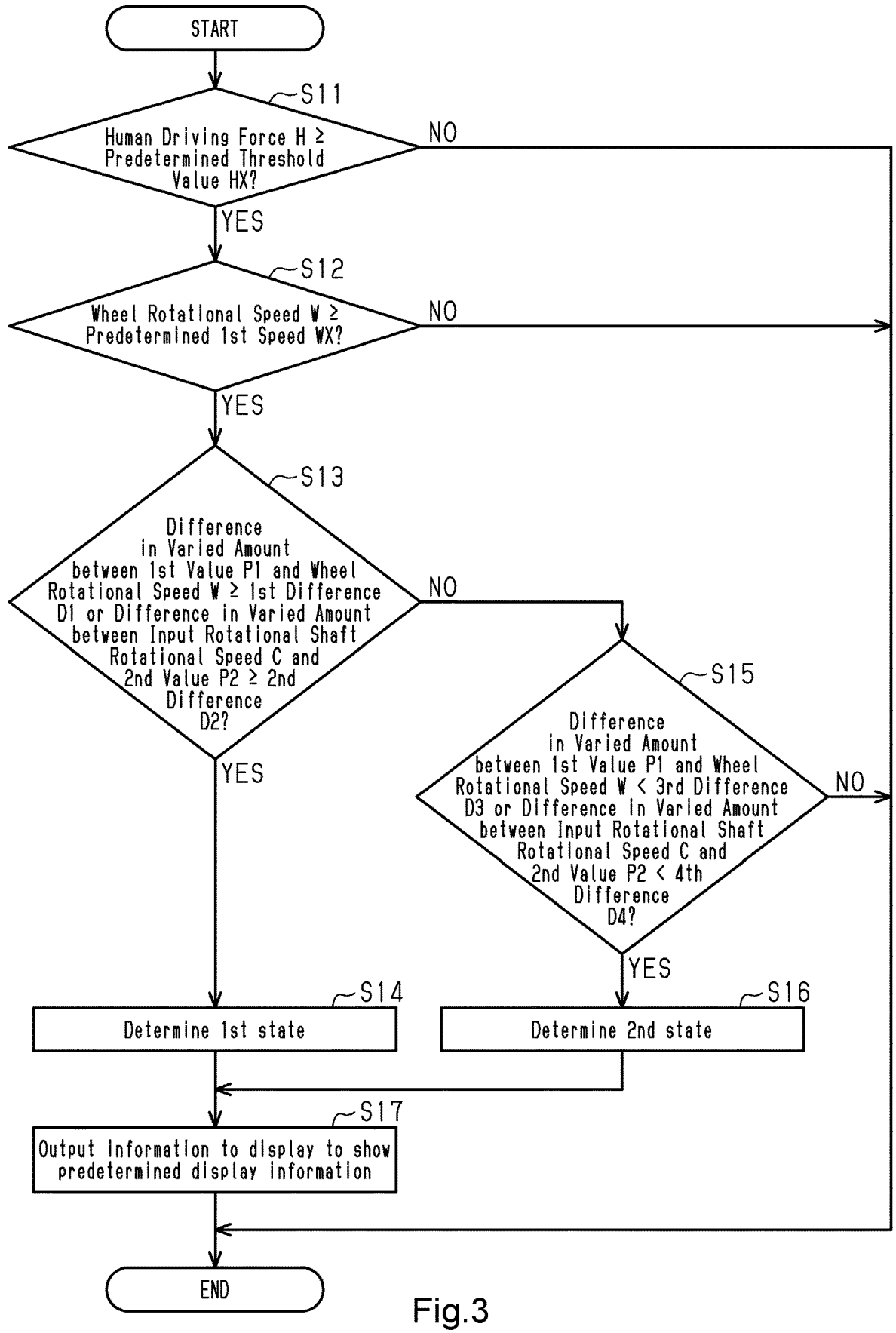
FIG. 3 is a flowchart of a process executed by an electronic controller of the electrical configuration shown in FIG. 2 for determining a predetermined state.
Figure 5:
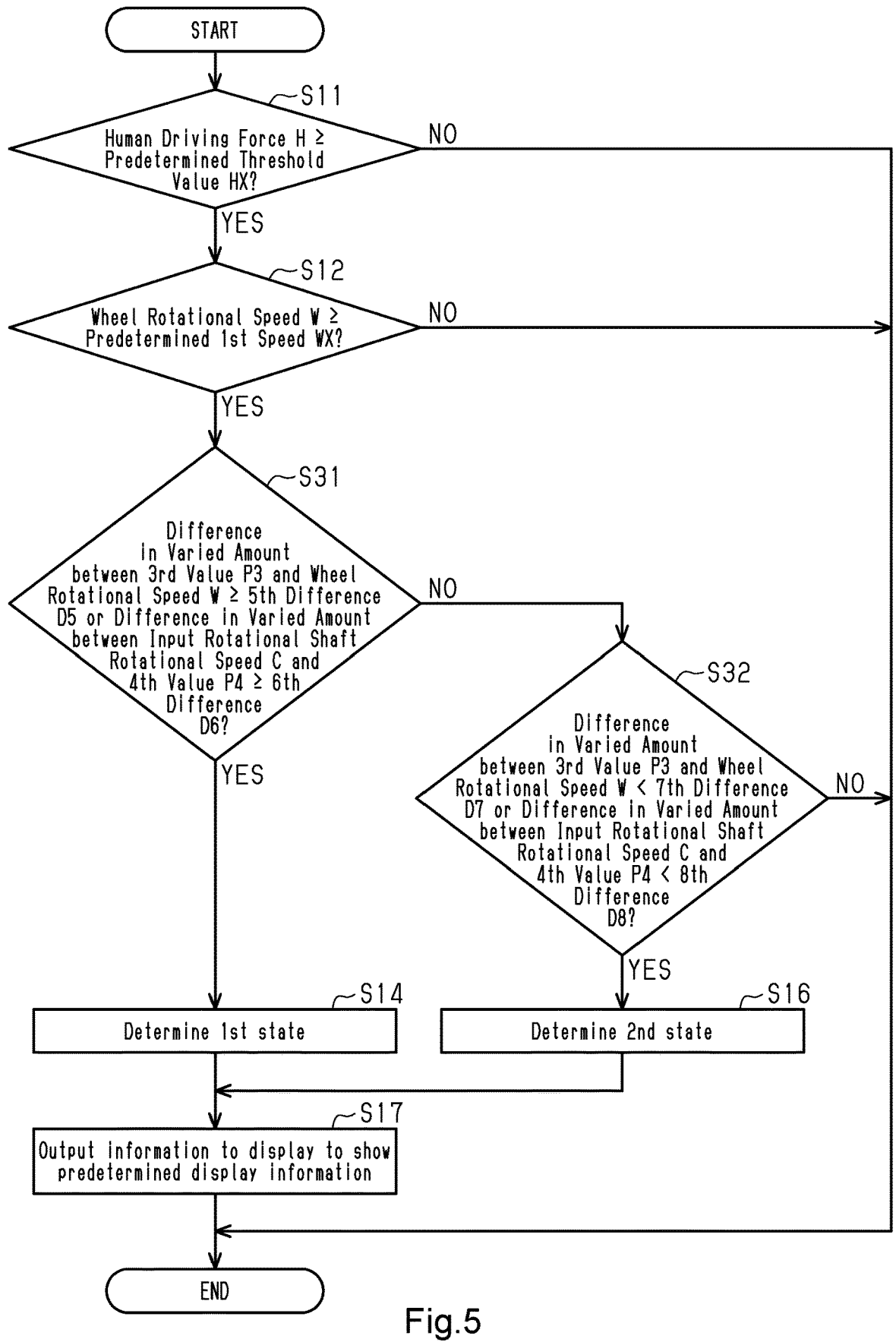
FIG. 5 is a flowchart of a process executed by a second embodiment of an electronic controller for determining a predetermined state.

In the flowchart shown in FIG. 5, step S31 is executed instead of step S13 shown in FIG. 3. In the flowchart shown in FIG. 5, step S32 is executed instead of step S15 shown in FIG. 3.

In a case where an affirmative determination is made in step S12, the controller 72 proceeds to step S31. In step S31, the controller 72 determines whether the difference of the varied amount of the third value P3 and the varied amount of the rotational speed W of the wheel 14 is greater than or equal to the fifth difference D5 or the difference of the varied amount of the rotational speed C of the input rotational shaft 12A and the varied amount of the fourth value P4 is greater than or equal to the sixth difference D6. Upon determining the difference of the varied amount of the third value P3 and the varied amount of the rotational speed W of the wheel 14 is greater than or equal to the fifth difference D5 or the difference of the varied amount of the rotational speed C of the input rotational shaft 12A and the varied amount of the fourth value P4 is greater than or equal to the sixth difference D6, the controller 72 proceeds to step S14. Upon determining the difference of the varied amount of the third value P3 and the varied amount of the rotational speed W of the wheel 14 is not greater than or equal to the fifth difference D5 and the difference of the varied amount of the rotational speed C of the input rotational shaft 12A and the varied amount of the fourth value P4 is not greater than or equal to the sixth difference D6, the controller 72 proceeds to step S32.

In step S32, upon determining the difference of the varied amount of the third value P3 and the varied amount of the rotational speed W of the wheel 14 is not less than the seventh difference D7 and the difference of the varied amount of the rotational speed C of the input rotational shaft 12A and the varied amount of the fourth value P4 is not less than the eighth difference D8, the controller 72 ends the process. Upon determining the difference of the varied amount of the third value P3 and the varied amount of the rotational speed W of the wheel 14 is less than the seventh difference D7 or the difference of the varied amount of the rotational speed C of the input rotational shaft 12A and the varied amount of the fourth value P4 is less than the eighth difference D8, the controller 72 proceeds to step S16.

In step S31, upon determining the difference of the varied amount of the third value P3 and the varied amount of the rotational speed W of the wheel 14 is greater than or equal to the fifth difference D5, the controller 72 can proceed to step S14. Upon determining the difference of the varied amount of the third value P3 with the varied amount of the rotational speed W of the wheel 14 is not greater than or equal to the fifth difference D5, the controller 72 can proceed to step S32. In step S31, upon determining the difference of the varied amount of the rotational speed C of the input rotational shaft 12A and the varied amount of the fourth value P4 is greater than or equal to the sixth difference D6, the controller 72 can proceed to step S14. Upon determining the difference of the varied amount of the rotational speed C of the input rotational shaft 12A and the varied amount of the fourth value P4 is not greater than or equal to the sixth difference D6, the controller 72 can proceed to step S32.

In step S32, upon determining the difference of the varied amount of the third value P3 and the varied amount of the rotational speed W of the wheel 14 is less than the seventh difference D7, the controller 72 can proceed to step S16. Upon determining the difference of the varied amount of the third value P3 and the varied amount of the rotational speed W of the wheel 14 is not less than the seventh difference D7, the controller 72 can end the process. In step S32, upon determining the difference of the varied amount of the rotational speed C of the input rotational shaft 12A and the varied amount of the fourth value P4 is less than the eighth difference D8, the controller 72 can proceed to step S16. Upon determining the difference of the varied amount of the rotational speed C of the input rotational shaft 12A and the varied amount of the fourth value P4 is not less than the eighth difference D8, the controller 72 can end the process.

Third Embodiment

A third embodiment of a control device 70 will now be described with reference to FIGS. 2 and 6. The control device 70 of the third embodiment is the same as the control devices 70 of the first and second embodiments except the process of determining the first state and the second state. Thus, the same reference characters are given to those components that are the same as the corresponding components of the first and second embodiments. Such components will not be described in detail.

The determination unit 62 obtains information related to the rotational speed C of the input rotational shaft 12A of the human-powered vehicle 10 and information related to the rotational speed W of the wheel 14 of the human-powered vehicle 10. The determination unit 62 is configured to determine the predetermined state in accordance with at least one of the first ratio R1 and the second ratio R2.

Preferably, the determination unit 62 is configured to determine the predetermined state in accordance with at least one of the first ratio R1 and the second ratio R2 in a state where the human driving force H applied to the human-powered vehicle 10 is greater than or equal to the predetermined threshold value HX. Preferably, the determination unit 62 determines that the predetermined state is the first state upon determining the first ratio R1 is greater than or equal to a predetermined third ratio R1X. Preferably, the determination unit 62 determines that the predetermined state is the second state upon determining the first ratio R1 is less than a predetermined fourth ratio R1Y. Preferably, the third ratio R1X is greater than the fourth ratio R1Y. The third ratio R1X can be equal to the fourth ratio R1Y.

A process for determining the first state and the second state will now be described with reference to FIG. 6. In a case in which electric power is supplied to the controller 72, the controller 72 starts the process and proceeds to step S11 of the flowchart shown in FIG. 6. In a case in which the flowchart shown in FIG. 6 ends, the controller 72 repeats the process from step S11 after a predetermined interval until the supply of electric power is stopped. Steps S11, S12, S14, and S17 in FIG. 6 correspond to steps S11, S12, S14, and S17 in FIG. 3. The same steps will not be described.

Figure 6:
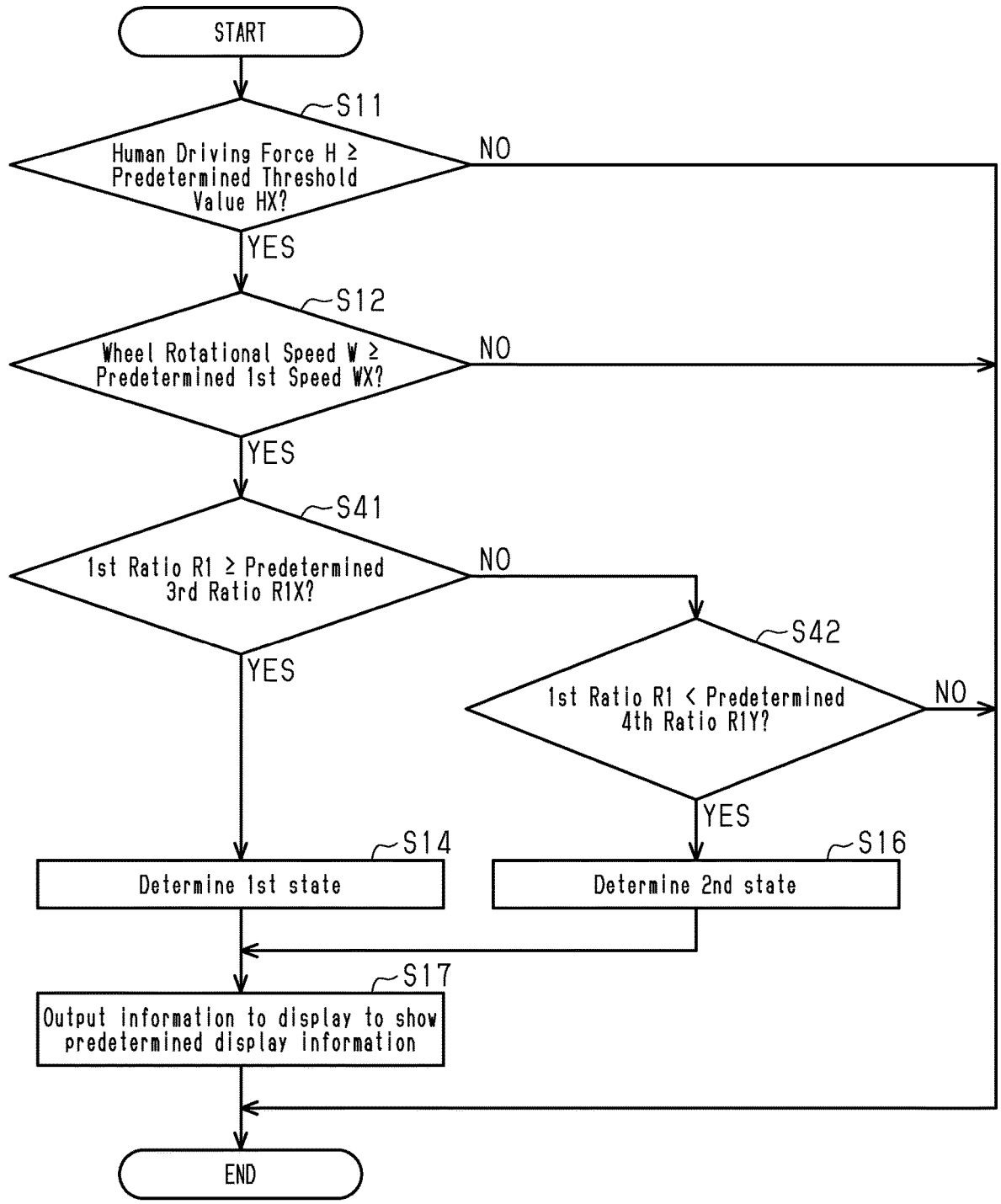
FIG. 6 is a flowchart of a process executed by a third embodiment of an electronic controller for determining a predetermined state.

In the flowchart shown in FIG. 6, step S41 is executed instead of step S13 shown in FIG. 3. In the flowchart shown in FIG. 6, step S42 is executed instead of step S15 shown in FIG. 3.

In a case where an affirmative determination is made in step S12, the controller 72 proceeds to step S41. In step S41, the controller 72 determines whether the first ratio R1 is greater than or equal to the predetermined third ratio R1X. Upon determining the first ratio R1 is greater than or equal to the predetermined third ratio R1X, the controller 72 proceeds to step S14. Upon determining the first ratio R1 is not greater than or equal to the predetermined third ratio R1X, the controller 72 proceeds to step S42.

In step S42, the controller 72 determines whether the first ratio R1 is less than the predetermined fourth ratio R1Y. Upon determining the first ratio R1 is not less than the predetermined fourth ratio R1Y, the controller 72 ends the process. Upon determining the first ratio R1 is less than the predetermined fourth ratio R1Y, the controller 72 proceeds to step S16.

Fourth Embodiment

A fourth embodiment of a control device 70 will now be described with reference to FIGS. 2 and 7. The control device 70 of the fourth embodiment is the same as the control devices 70 of the first to third embodiments except the process of determining the first state and the second state. Thus, the same reference characters are given to those components that are the same as the corresponding components of the first to third embodiments. Such components will not be described in detail. Thus, the same reference characters are given to those components that are the same as the corresponding components of the first to third embodiments. Such components will not be described detail.

Preferably, upon determining the second ratio R2 is less than a predetermined fifth ratio R2X, the determination unit 62 determines that the predetermined state is the first state. Preferably, upon determining the second ratio R2 is greater than or equal to a predetermined sixth ratio R2Y, the determination unit 62 determines that the predetermined state is the second state. Preferably, the fifth ratio R2X is less than the sixth ratio R2Y. The fifth ratio R2X can be equal to the sixth ratio R2Y.

A process for determining the first state and the second state will now be described with reference to FIG. 7. In a case in which electric power is supplied to the controller 72, the controller 72 starts the process and proceeds to step S11 of the flowchart shown in FIG. 7. In a case in which the flowchart shown in FIG. 7 ends, the controller 72 repeats the process from step S11 after a predetermined interval until the supply of electric power is stopped. Steps S11, S12, S14, and S17 in FIG. 7 correspond to steps S11, S12, S14, and S17 in FIG. 3. The same steps will not be described.

Figure 7:
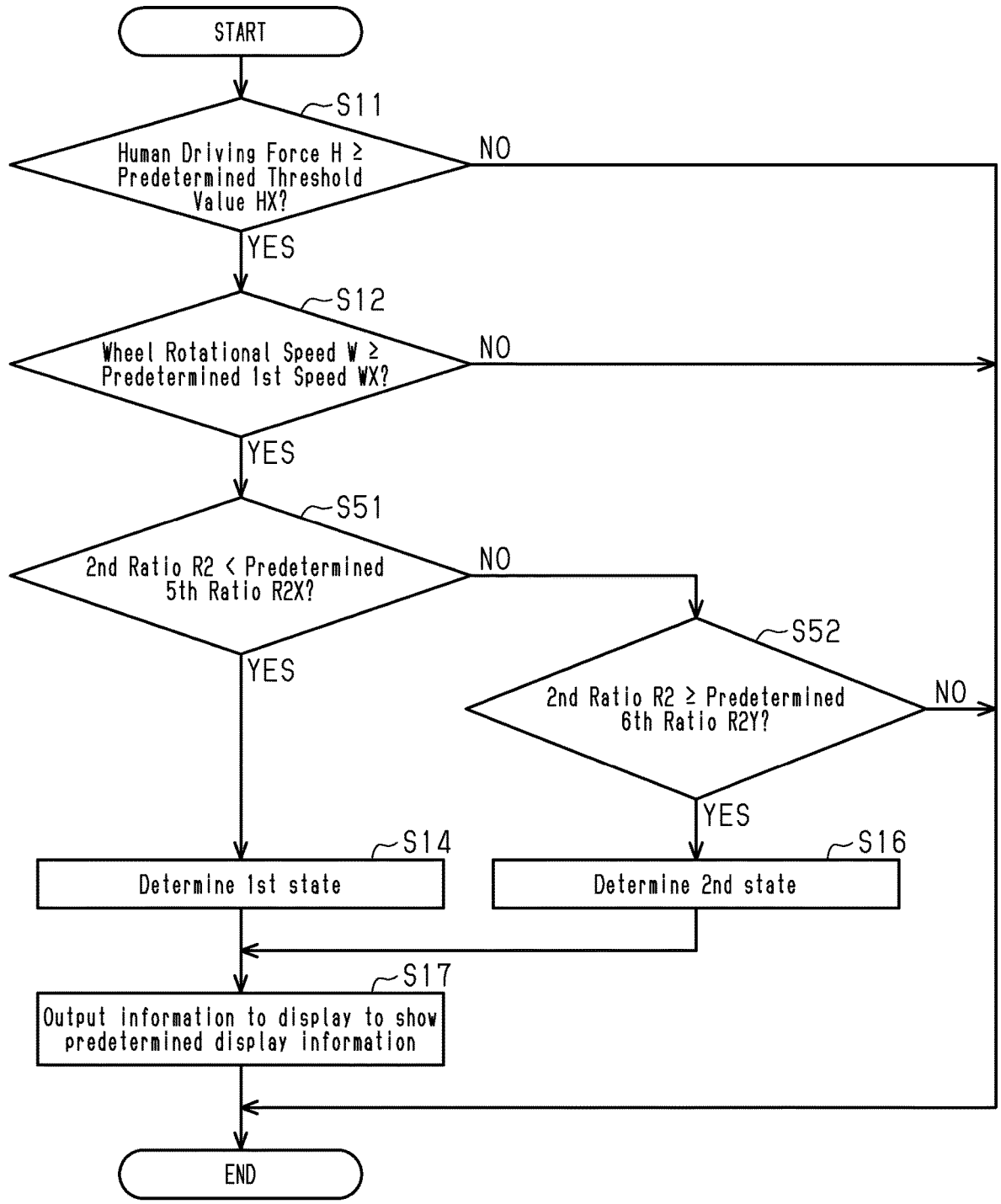
FIG. 7 is a flowchart of a process executed by a fourth embodiment of an electronic controller for determining a predetermined state.

In the flowchart shown in FIG. 7, step S51 is executed instead of step S13 shown in FIG. 3. In the flowchart shown in FIG. 7, step S52 is executed instead of step S15 shown in FIG. 3.

In a case where an affirmative determination is made in step S12, the controller 72 proceeds to step S51. In step S51, the controller 72 determines whether the second ratio R2 is less than the predetermined fifth ratio R2X. Upon determining the second ratio R2 is less than the predetermined fifth ratio R2X, the controller 72 proceeds to step S14. Upon determining the second ratio R2 is not less than the predetermined fifth ratio R2X, the controller 72 proceeds to step S52.

In step S52, the controller 72 determines whether the second ratio R2 is greater than or equal to the predetermined sixth ratio R2Y. Upon determining the second ratio R2 is not greater than or equal to the predetermined sixth ratio R2Y, the controller 72 ends the process. Upon determining the second ratio R2 is greater than or equal to the predetermined sixth ratio R2Y, the controller 72 proceeds to step S16.

Modifications

The description related to the above embodiments exemplifies, without any intention to limit, applicable forms of a human-powered vehicle determination device and a human-powered vehicle control device according to the present disclosure. The human-powered vehicle determination device and the human-powered vehicle control device according to the present disclosure can be applied to, for example, modifications of the embodiments that are described below and combinations of at least two of the modifications that do not contradict each other. In the modifications described hereinafter, same reference characters are given to those components that are the same as the corresponding components of the above embodiments. Such components will not be described in detail.

Figure 4:
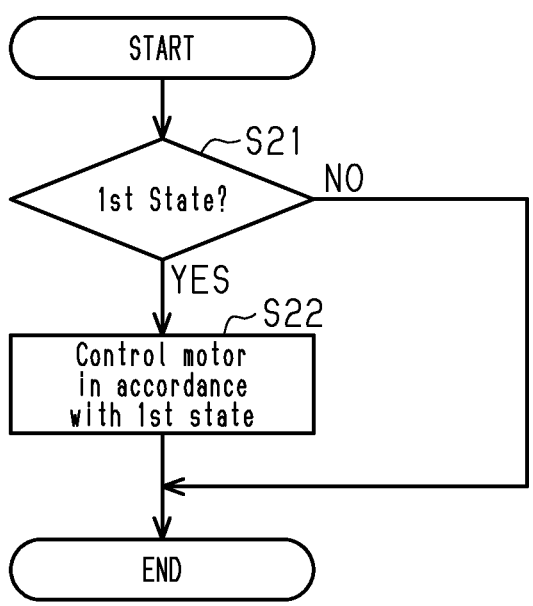
FIG. 4 is a flowchart of a process executed by the electronic controller of the electrical configuration shown in FIG. 2 for controlling a motor.

The process shown in the flowchart of FIG. 4 can be omitted from the first embodiment, the second embodiment, the third embodiment, the fourth embodiment, modifications of the first embodiment, modifications of the second embodiment, modifications of the third embodiment, and modifications of the fourth embodiment. In this case, the motor 40 can be omitted from the human-powered vehicle 10. In this case, the vehicle component 38 can include only the display 42 or an electric component controlled in accordance with output of the detector 46 instead of or in addition to the display 42. The electric component includes, for example, at least one of a suspension, an adjustable seatpost, and a brake.

In the first embodiment, the second embodiment, the third embodiment, the fourth embodiment, modifications of the first embodiment, modifications of the second embodiment, modifications of the third embodiment, and modifications of the fourth embodiment, the controller 72 can be configured to show the predetermined display information on the display 42 in only one of the first state and the second state. For example, upon determining in step S16 that the predetermined state is the second state, the controller 72 can end the process without outputting the information including an indication of the second state to the display 42.

In the first embodiment, the second embodiment, modifications of the first embodiment and modifications of the second embodiment, step S17 can be omitted from each flowchart of FIGS. 3, 5, 6, and 7. In this case, the display 42 can be omitted from the vehicle component 38. For example, upon determining in step S14 that the predetermined state is the first state, the controller 72 ends the process. For example, upon determining in step S16 that the predetermined state is the second state, the controller 72 ends the process.

In the first embodiment, the second embodiment, modifications of the first embodiment, and modifications of the second embodiment, the controller 72 can be configured not to control the vehicle component 38. In this case, for example, the controller 72 can store the determined predetermined state in the storage 74. Preferably, the controller 72 has functions of a calendar and a clock and stores the determined predetermined state associated with information related to date and time in the storage 74.

Step S15 of FIG. 3 can be omitted from the first embodiment and modifications of the first embodiment. In this case, in a case where a negative determination is made in step S13, step S16 is executed.

Step S32 of FIG. 5 can be omitted from the second embodiment and modifications of the second embodiment. In this case, in a case where a negative determination is made in step S31, step S16 is executed.

Step S42 of FIG. 6 can be omitted from the third embodiment and modifications of the third embodiment. In this case, in a case where a negative determination is made in step S41, step S16 is executed.

Step S52 of FIG. 7 can be omitted from the fourth embodiment and modifications of the fourth embodiment. In this case, in a case where a negative determination is made in step S51, step S16 is executed.

In the first embodiment, the second embodiment, the third embodiment, the fourth embodiment, modifications of the first embodiment, modifications of the second embodiment, modifications of the third embodiment, and modifications of the fourth embodiment, the controller 72 can control the vehicle component 38 without determining the predetermined state. For example, in a state in which the human driving force H applied to the human-powered vehicle 10 is greater than or equal to the predetermined threshold value HX, the controller 72 is configured to control the vehicle component 38 of the human-powered vehicle 10 in accordance with the varied amount of the rotational speed C of the input rotational shaft 12A and the varied amount of the rotational speed W of the wheel 14. Preferably, the controller 72 is configured to further obtain at least one of the first information related to the first ratio R1 and the second information related to the second ratio R2 and control the vehicle component 38 in accordance with the varied amount of the rotational speed of the input rotational shaft 12A, the varied amount of the rotational speed W of the wheel 14, and at least one of the first ratio R1 and the second ratio R2 in a state where the human driving force H is greater than or equal to the predetermined threshold value HX. In this modification, the controller 72 controls the vehicle component 38 in accordance with, for example, a comparison of the varied amount of the first value P1 and the varied amount of the rotational speed W of the wheel 14 or a comparison of the varied amount of the rotational speed C of the input rotational shaft 12A and the varied amount of the second value P2.

Figure 8:
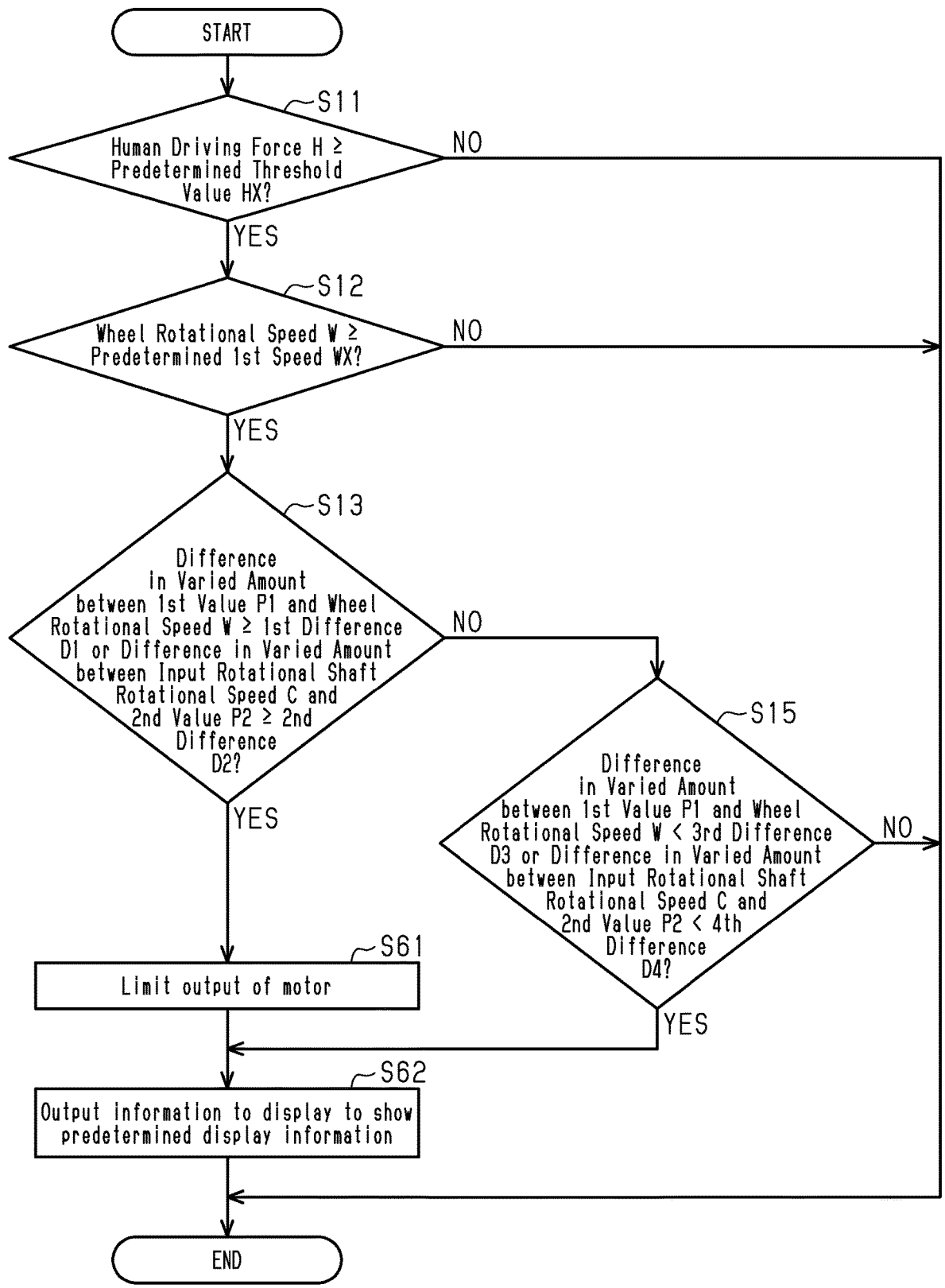
FIG. 8 is a flowchart of a process executed by a first modification of a controller for limiting output of a motor.

In a first example in which the vehicle component 38 includes the motor 40, the controller 72 is configured to limit output of the motor 40 upon determining the difference of the varied amount of the first value P1 and the varied amount of the rotational speed W of the wheel 14 is greater than or equal to the first difference D1 or the difference of the varied amount of the rotational speed C of the input rotational shaft 12A and the varied amount of the second value P2 is greater than or equal to the second difference D2. For example, the flowchart shown in FIG. 3 can be changed to the flowchart shown in FIG. 8. Steps S11, S12, S13, and S15 in FIG. 8 correspond to steps S11, S12, S13, and S15 in FIG. 3. The same steps will not be described. In FIG. 8, a case where an affirmative determination is made in step S13, the controller 72 proceeds to step S61. The controller 72 limits output of the motor 40 in step S61 and proceeds to step S62. In FIG. 8, in a case where an affirmative determination is made in step S15, the controller 72 proceeds to step S62. Preferably, in step S62, the controller 72 outputs information to the display 42 to show predetermined information that differs between a case where an affirmative determination is made in step S13 and a case where an affirmative determination is made in step S15. In the present modification, the display 42 shows predetermined display information that differs between a case where the limiting process of the motor 40 is executed and a case where the limiting process of the motor 40 is not executed. In a case where an affirmative determination is made in step S15, the controller 72 can end the process. The display 42 can be configured to show the predetermined display information only in a case where the limiting process of the motor 40 is executed. In the first example, in a case of controlling the motor 40, the controller 72 controls the motor 40 so that output of the motor 40 in a case where step S61 is executed is less than output of the motor 40 in a case where step S61 is not executed.

Figure 9:
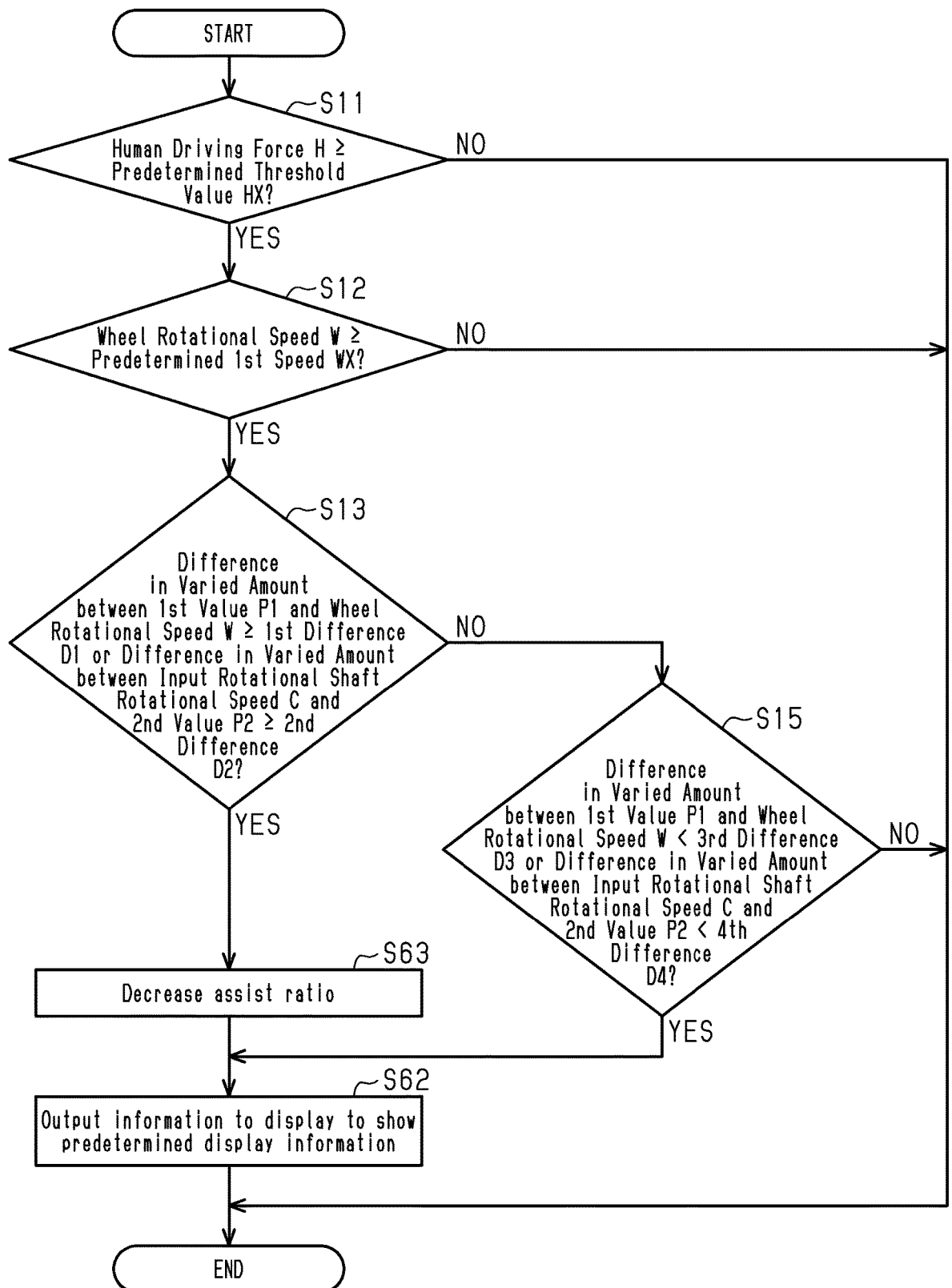
FIG. 9 is a flowchart of a process executed by a second modification of an electronic controller for decreasing an assist ratio.

In a second example in which the vehicle component 38 includes the motor 40, the controller 72 is configured to decrease the assist ratio X upon determining the difference of the varied amount of the first value P1 and the varied amount of the rotational speed W of the wheel 14 is greater than or equal to the first difference D1 or the difference of the varied amount of the rotational speed C of the input rotational shaft 12A and the varied amount of the second value P2 is greater than or equal to the second difference D2. For example, the flowchart shown in FIG. 8 can be changed to the flowchart shown in FIG. 9. Steps S11, S12, S13, S15, and S62 in FIG. 9 correspond to steps S11, S12, S13, S15, and S62 in FIG. 8. The same steps will not be described. In the flowchart shown in FIG. 9, step S63 is executed instead of step S61 shown in FIG. 8. In FIG. 9, in a case where an affirmative determination is made in step S13, the controller 72 proceeds to step S63. The controller 72 decreases the assist ratio X in step S63 and proceeds to step S62. In the present modification, the display 42 shows predetermined display information that differs between a case where the decreasing process of the assist ratio X is executed and a case where the decreasing process of the assist ratio X is not executed. The display 42 can be configured to show the predetermined display information only in a case where the decreasing process of the assist ratio X is executed. In the second example, in a case of controlling the motor 40, the controller 72 controls the motor 40 so that the assist ratio X in a case where step S63 is executed is less than the assist ratio X in a case where step S63 is not executed.

Figure 10:
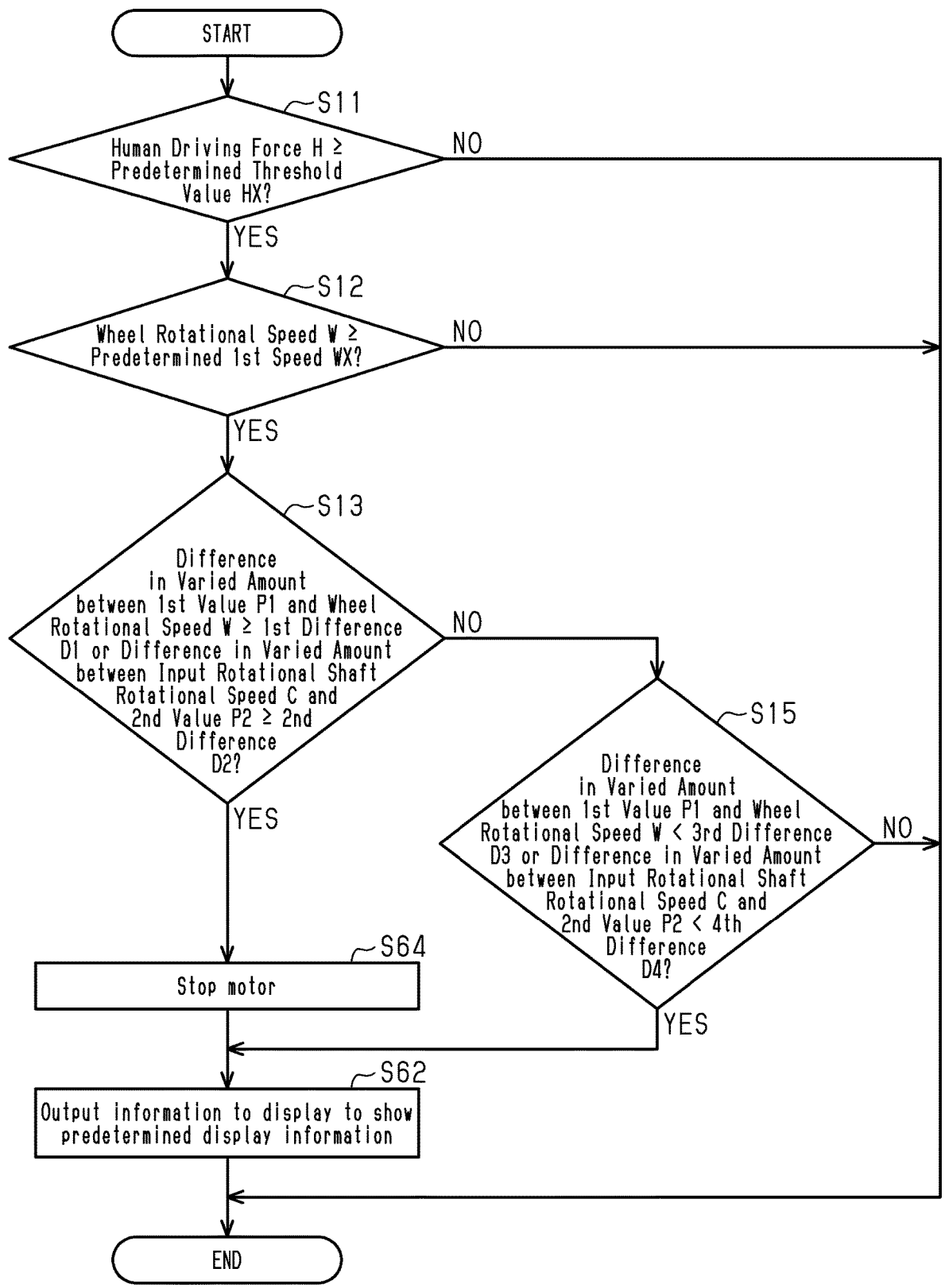
FIG. 10 is a flowchart of a process executed by a third modification of an electronic controller for stopping a motor.

In a third example in which the vehicle component 38 includes the motor 40, the controller 72 is configured to stop the motor 40 upon determining the difference of the varied amount of the first value P1 and the varied amount of the rotational speed W of the wheel 14 is greater than or equal to the first difference D1 or the difference of the varied amount of the rotational speed C of the input rotational shaft 12A and the varied amount of the second value P2 is greater than or equal to the second difference D2. For example, the flowchart shown in FIG. 8 can be changed to the flowchart shown in FIG. 10. Steps S11, S12, S13, S15, and S62 in FIG. 10 correspond to steps S11, S12, S13, S15, and S62 in FIG. 8. The same steps will not be described. In the flowchart shown in FIG. 10, step S64 is executed instead of step S61 shown in FIG. 8. In FIG. 10, in a case where an affirmative determination is made in step S13, the controller 72 proceeds to step S64. The controller 72 stops the motor 40 in step S64 and proceeds to step S62. In the present modification, the display 42 shows predetermined display information that differs between a case where the stopping process of the motor 40 is executed and a case where the stopping process of the motor 40 is not executed. The display 42 can be configured to show the predetermined display information only in a case where the stopping process of the motor 40 is executed. In the third example, in a case of controlling the motor 40, the controller 72 does not drive the motor 40 in a case where step S64 is executed.

Figure 11:
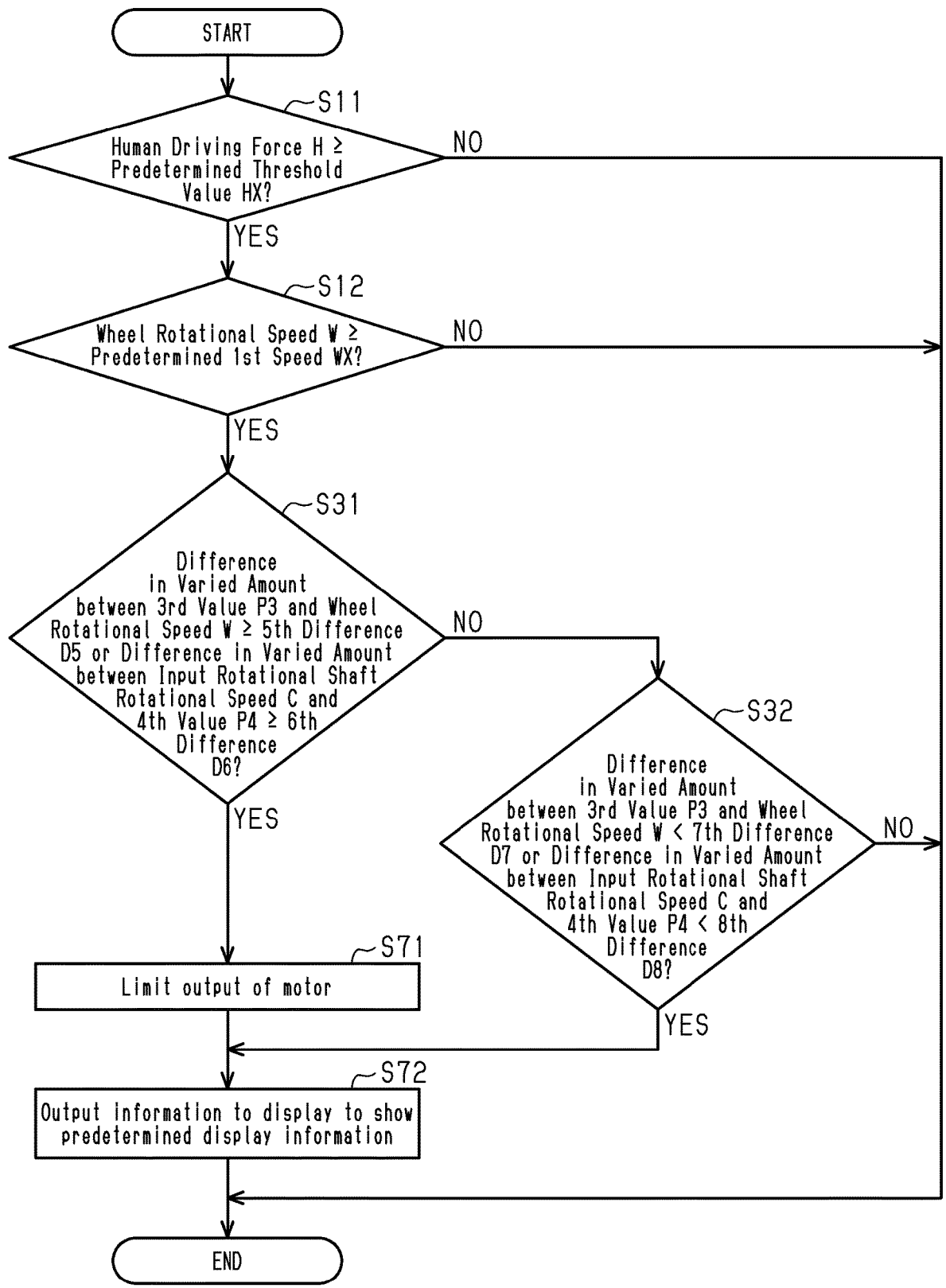
FIG. 11 is a flowchart of a process executed by a fourth modification of an electronic controller for limiting output of a motor.

In a fourth example in which the vehicle component 38 includes the motor 40, the controller 72 is configured to limit output of the motor 40 upon determining the difference of the varied amount of the third value obtained by dividing the rotational speed of the input rotational shaft 12A by the second ratio and the varied amount of the rotational speed W of the wheel 14 is greater than or equal to the fifth difference D5 or the difference of the varied amount of the rotational speed of the input rotational shaft 12A and the varied amount of the fourth value obtained by multiplying the rotational speed W of the wheel 14 by the second ratio is greater than or equal to the sixth difference D6. For example, the flowchart shown in FIG. 5 can be changed to the flowchart shown in FIG. 11. Steps S11, S12, S31, and S32 in FIG. 11 correspond to steps S11, S12, S31, and S32 in FIG. 5. The same steps will not be described. In FIG. 11, in a case where an affirmative determination is made in step S31, the controller 72 proceeds to step S71. The controller 72 limits output of the motor 40 in step S71 and proceeds to step S72. In FIG. 11, in a case where an affirmative determination is made in step S32, the controller 72 proceeds to step S72. Preferably, in step S72, the controller 72 outputs information to the display 42 to show predetermined information that differs between a case where an affirmative determination is made in step S31 and a case where an affirmative determination is made in step S32. In the present modification, the display 42 shows predetermined display information that differs between a case where the limiting process of the motor 40 is executed and a case where the limiting process of the motor 40 is not executed. In a case where an affirmative determination is made in step S32, the controller 72 can end the process. The display 42 can be configured to show the predetermined display information only in a case where the limiting process of the motor 40 is executed. In the fourth example, in a case of controlling the motor 40, the controller 72 controls the motor 40 so that output of the motor 40 in a case where step S71 is executed is less than output of the motor 40 in a case where step S71 is not executed.

Figure 12:
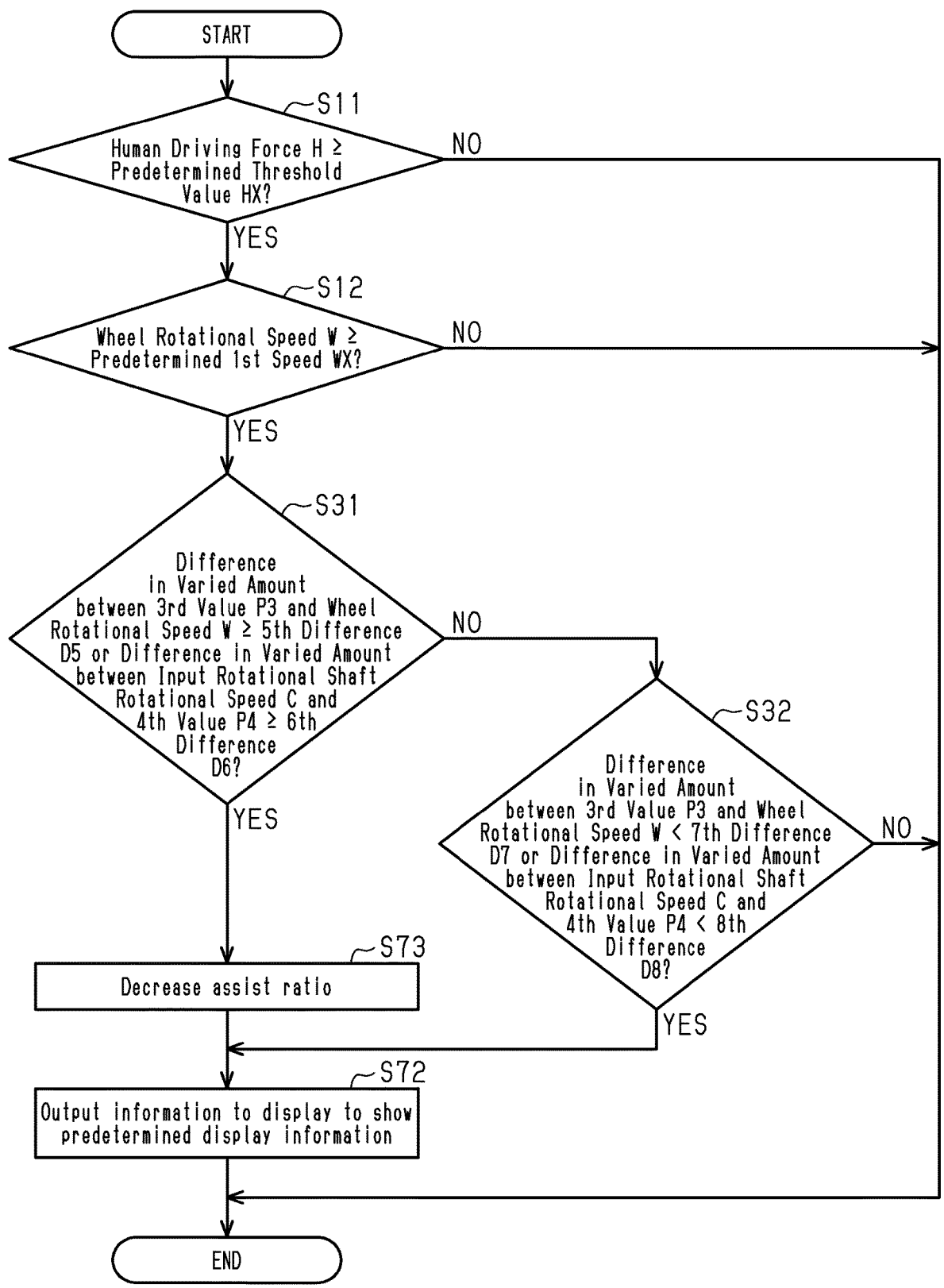
FIG. 12 is a flowchart of a process executed by a fifth modification of an electronic controller for decreasing an assist ratio.

In a fifth example in which the vehicle component 38 includes the motor 40, the controller 72 is configured to decrease the assist ratio X upon determining the difference of the varied amount of the third value P3 and the varied amount of the rotational speed W of the wheel 14 is greater than or equal to the fifth difference D5 or the difference of the varied amount of the rotational speed C of the input rotational shaft 12A and the varied amount of the fourth value P4 is greater than or equal to the sixth difference D6. For example, the flowchart shown in FIG. 11 can be changed to the flowchart shown in FIG. 12. Steps S11, S12, S31, S32, and S72 in FIG. 12 correspond to steps S11, S12, S31, S32, and S72 in FIG. 11. The same steps will not be described. In the flowchart shown in FIG. 12, step S73 is executed instead of step S71 shown in FIG. 11. In FIG. 12, in a case where an affirmative determination is made in step S31, the controller 72 proceeds to step S73. The controller 72 decreases the assist ratio X in step S73 and proceeds to step S72. In the present modification, the display 42 shows predetermined display information that differs between a case where the decreasing process of the assist ratio X is executed and a case where the decreasing process of the assist ratio X is not executed. The display 42 can be configured to show the predetermined display information only in a case where the decreasing process of the assist ratio X is executed. In the fifth example, in a case of controlling the motor 40, the controller 72 controls the motor 40 so that the assist ratio X in a case where step S73 is executed is less than the assist ratio X in a case where step S73 is not executed.

Figure 13:
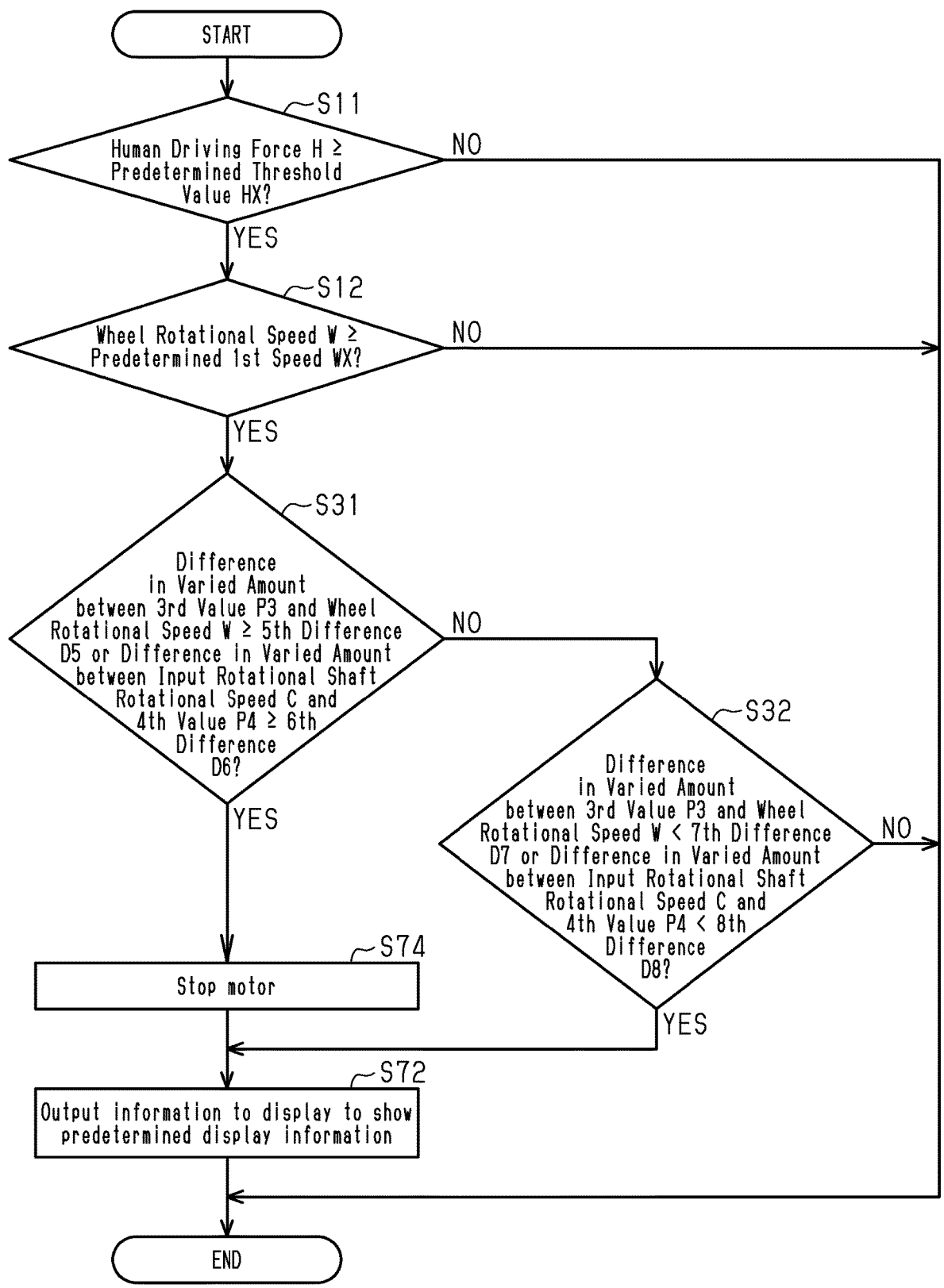
FIG. 13 is a flowchart of a process executed by a sixth modification of an electronic controller for stopping a motor.

In a sixth example in which the vehicle component 38 includes the motor 40, the controller 72 is configured to stop the motor 40 upon determining the difference of the varied amount of the third value P3 and the varied amount of the rotational speed W of the wheel 14 is greater than or equal to the fifth difference D5 or the difference of the varied amount of the rotational speed C of the input rotational shaft 12A and the varied amount of the fourth value P4 is greater than or equal to the sixth difference D6. For example, the flowchart shown in FIG. 11 can be changed to the flowchart shown in FIG. 13. Steps S11, S12, S31, S32, and S72 in FIG. 13 correspond to steps S11, S12, S31, S32, and S72 in FIG. 11. The same steps will not be described. In the flowchart shown in FIG. 13, step S74 is executed instead of step S71 shown in FIG. 11. In FIG. 13, in a case where an affirmative determination is made in step S31, the controller 72 proceeds to step S74. The controller 72 stops the motor 40 in step S74 and proceeds to step S72. In the present modification, the display 42 shows predetermined display information that differs between a case where the stopping process of the motor 40 is executed and a case where the stopping process of the motor 40 is not executed. The display 42 can be configured to show the predetermined display information only in a case where the stopping process of the motor 40 is executed. In the sixth example, in a case of controlling the motor 40, the controller 72 does not drive the motor 40 in a case where step S74 is executed.

In a seventh example in which the vehicle component 38 includes the motor 40, the controller 72 is configured to limit output of the motor 40 upon determining the first ratio R1 is greater than or equal to the predetermined third ratio R1X. In the seventh example, for example, steps S14 and S16 are omitted from the flowchart shown in FIG. 6. In a case where an affirmative determination is made in step S41, the controller 72 limits output of the motor 40 in the same manner as step S61 of the flowchart shown in FIG. 8 and then proceeds to step S17. In a case where an affirmative determination is made in step S42, the controller 72 proceeds to step S17. In the seventh example, in step S17, the controller 72 outputs information to the display 42 to show predetermined information that differs between a case where an affirmative determination is made in step S41 and a case where an affirmative determination is made in step S42.

In an eighth example in which the vehicle component 38 includes the motor 40, the controller 72 is configured to decrease the assist ratio X upon determining the first ratio R1 is greater than or equal to the predetermined third ratio R1X. In the eighth example, for example, steps S14 and S16 are omitted from the flowchart shown in FIG. 6. In a case where an affirmative determination is made in step S41, the controller 72 decreases the assist ratio X in the same manner as step S63 of the flowchart shown in FIG. 9 and then proceeds to step S17. In a case where an affirmative determination is made in step S42, the controller 72 proceeds to step S17. In the eighth example, in step S17, the controller 72 outputs information to the display 42 to show predetermined information that differs between a case where an affirmative determination is made in step S41 and a case where an affirmative determination is made in step S42.

In a ninth example in which the vehicle component 38 includes the motor 40, the controller 72 is configured to stop the motor 40 upon determining the first ratio R1 is greater than or equal to the predetermined third ratio R1X. In the ninth example, for example, steps S14 and S16 are omitted from the flowchart shown in FIG. 6. In a case where an affirmative determination is made in step S41, the controller 72 stops the motor 40 in the same manner as step S64 of the flowchart shown in FIG. 10 and then proceeds to step S17. In a case where an affirmative determination is made in step S42, the controller 72 proceeds to step S17. In the ninth example, in step S17, the controller 72 outputs information to the display 42 to show predetermined information that differs between a case where an affirmative determination is made in step S41 and a case where an affirmative determination is made in step S42.

In a tenth example in which the vehicle component 38 includes the motor 40, the controller 72 is configured to limit output of the motor 40 upon determining the second ratio R2 is less than the predetermined fifth ratio R2X. In the tenth example, for example, steps S14 and S16 are omitted from the flowchart shown in FIG. 7. In a case where an affirmative determination is made in step S51, the controller 72 limits output of the motor 40 in the same manner as step S61 of the flowchart shown in FIG. 8 and then proceeds to step S17. In a case where an affirmative determination is made in step S52, the controller 72 proceeds to step S17. In the tenth example, in step S17, the controller 72 outputs information to the display 42 to show predetermined information that differs between a case where an affirmative determination is made in step S51 and a case where an affirmative determination is made in step S52.

In an eleventh example in which the vehicle component 38 includes the motor 40, the controller 72 is configured to decrease the assist ratio X upon determining the second ratio R2 is less than the predetermined fifth ratio R2X. In the eleventh example, for example, steps S14 and S16 are omitted from the flowchart shown in FIG. 7. In a case where an affirmative determination is made in step S51, the controller 72 decreases the assist ratio X in the same manner as step S63 of the flowchart shown in FIG. 9 and then proceeds to step S17. In a case where an affirmative determination is made in step S52, the controller 72 proceeds to step S17. In the eleventh example, in step S17, the controller 72 outputs information to the display 42 to show predetermined information that differs between a case where an affirmative determination is made in step S51 and a case where an affirmative determination is made in step S52.

In a twelfth example in which the vehicle component 38 includes the motor 40, the controller 72 is configured to stop the motor 40 upon determining the second ratio R2 is less than the predetermined fifth ratio R2X. In the twelfth example, for example, in a case where an affirmative determination is made in step S51 of the flowchart shown in FIG. 7, the controller 72 stops the motor 40 in the same manner as in step S64 of the flowchart shown in FIG. 10 and then proceeds to step S17. In a case where an affirmative determination is made in step S52, the controller 72 proceeds to step S17. In the twelfth example, in step S17, the controller 72 outputs information to the display 42 to show predetermined information that differs between a case where an affirmative determination is made in step S51 and a case where an affirmative determination is made in step S52.

In an embodiment including a flowchart having steps S11, S12, and S13 and its modifications, in a case where an affirmative determination is made in step S13, the controller 72 can proceed to step S11. Then, in a case where affirmative determinations are consecutively made in all of steps S11, S12, and S13 for a number of times, the controller 72 can proceed to step S14. This configuration reduces erroneous detections.

In an embodiment including a flowchart having steps S11, S12, and S31 and its modifications, in a case where an affirmative determination is made in step S31, the controller 72 can proceed to step S11. Then, in a case where affirmative determinations are consecutively made in all of steps S11, S12, and S31 for a number of times, the controller 72 can proceed to step S14. This configuration reduces erroneous detections.

In an embodiment including a flowchart having steps S11, S12, and S51 and its modifications, in a case where an affirmative determination is made in step S51, the controller 72 can proceed to step S11. Then, in a case where affirmative determinations are consecutively made in all of steps S11, S12, and S51 for a number of times, the controller 72 can proceed to step S14. This configuration reduces erroneous detections.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A determination device for a human-powered vehicle, the determination device comprising:
   a processor configured to obtain information related to a rotational speed of an input rotational shaft of the human-powered vehicle and information related to a rotational speed of a wheel of the human-powered vehicle to determine a predetermined state in accordance with a varied amount of the rotational speed of the input rotational shaft and a varied amount of the rotational speed of the wheel in a state in which a human driving force that is applied to the human-powered vehicle is greater than or equal to a predetermined threshold value, the processor being configured to obtain the information related to the rotational speed of the wheel from a detector, and
   the predetermined state including at least one of a state in which the detector is not configured by a predetermined detector and a state in which the detector is defective.

2. The determination device according to claim 1, wherein the processor is configured to determine the predetermined state upon determining the rotational speed of the wheel is greater than or equal to a predetermined first speed.

3. A determination device for a human-powered vehicle, the determination device comprising:
   a processor configured to obtain information related to a rotational speed of an input rotational shaft of the human-powered vehicle and information related to a rotational speed of a wheel of the human-powered vehicle to determine a predetermined state in accordance with a varied amount of the rotational speed of the input rotational shaft and a varied amount of the rotational speed of the wheel in a state in which a human driving force that is applied to the human-powered vehicle is greater than or equal to a predetermined threshold value,
   the processor being configured to further obtain at least one of first information related to a first ratio of the rotational speed of the wheel to the rotational speed of the input rotational shaft and second information related to a second ratio of the rotational speed of the input rotational shaft to the rotational speed of the wheel to determine the predetermined state based on the varied amount of the rotational speed of the input rotational shaft, the varied amount of the rotational speed of the wheel, and at least one of the first ratio and the second ratio in a state in which the human driving force is greater than or equal to the predetermined threshold value.

4. The determination device according to claim 3, wherein the processor is configured to determine the predetermined state in accordance with a comparison of a varied amount of a first value obtained by multiplying the rotational speed of the input rotational shaft by the first ratio with the varied amount of the rotational speed of the wheel or a comparison of the varied amount of the rotational speed of the input rotational shaft with a varied amount of a second value obtained by dividing the rotational speed of the wheel by the first ratio.

5. The determination device according to claim 4, wherein the processor is configured to determine that the predetermined state is a first state upon determining a difference of the varied amount of the first value and the varied amount of the rotational speed of the wheel is greater than or equal to a first difference or a difference of the varied amount of the rotational speed of the input rotational shaft and the varied amount of the second value is greater than or equal to a second difference.

6. The determination device according to claim 4, wherein the processor is configured to determine that the predetermined state is a second state upon determining a difference of the varied amount of the first value and the varied amount of the rotational speed of the wheel is less than a third difference or a difference of the varied amount of the rotational speed of the input rotational shaft and the varied amount of the second value is less than a fourth difference.

7. The determination device according to claim 6, wherein the processor is configured to obtain the information related to the rotational speed of the wheel from a detector, and
the second state includes a state in which the detector is configured by a predetermined detector.

8. The determination device according to claim 4, wherein the processor is configured to determine the predetermined state in accordance with a comparison of a varied amount of a third value obtained by dividing the rotational speed of the input rotational shaft by the second ratio with the varied amount of the rotational speed of the wheel or a comparison of the varied amount of the rotational speed of the input rotational shaft with a varied amount of a fourth value obtained by multiplying the rotational speed of the wheel by the second ratio.

9. The determination device according to claim 8, wherein the processor is configured to determine that the predetermined state is a first state upon determining a difference of the varied amount of the third value and the varied amount of the rotational speed of the wheel is greater than or equal to a fifth difference or a difference of the varied amount of the rotational speed of the input rotational shaft and the varied amount of the fourth value is greater than or equal to a sixth difference.

10. The determination device according to claim 8, wherein
the processor is configured to determine that the predetermined state is a second state upon determining a difference of the varied amount of the third value and the varied amount of the rotational speed of the wheel is less than a seventh difference or a difference of the varied amount of the rotational speed of the input rotational shaft and the varied amount of the fourth value is less than an eighth difference.

11. A determination device for a human-powered vehicle, the determination device comprising:
a processor configured to obtain information related to a rotational speed of an input rotational shaft of the human-powered vehicle and information related to a rotational speed of a wheel of the human-powered vehicle to determine a predetermined state in accordance with at least one of a first ratio of the rotational speed of the wheel to the rotational speed of the input rotational shaft and a second ratio of the rotational speed of the input rotational shaft to the rotational speed of the wheel.

12. The determination device according to claim 11, wherein
the processor is configured to determine the predetermined state in accordance with at least one of the first ratio and the second ratio in a state in which a human driving force that is applied to the human-powered vehicle is greater than or equal to a predetermined threshold value.

13. The determination device according to claim 11, wherein
the processor is configured to determine that the predetermined state is a first state upon determining the first ratio is greater than or equal to a predetermined third ratio.

14. The determination device according to claim 11, wherein
the processor is configured to determine that the predetermined state is a second state upon determining the first ratio is less than a predetermined fourth ratio.

15. The determination device according to claim 11, wherein
the processor is configured to determine that the predetermined state is a first state upon determining the second ratio is less than a predetermined fifth ratio.

16. The determination device according to claim 11, wherein
the processor is configured to determine that the predetermined state is a second state upon determining the second ratio is greater than or equal to a predetermined sixth ratio.

17. A control device for a human-powered vehicle, the control device comprising:
an electronic controller configured to obtain information related to a rotational speed of an input rotational shaft of the human-powered vehicle and information related to a rotational speed of a wheel of the human-powered vehicle to control a vehicle component of the human-powered vehicle in accordance with a varied amount of the rotational speed of the input rotational shaft and a varied amount of the rotational speed of the wheel in a state in which a human driving force that is applied to the human-powered vehicle is greater than or equal to a predetermined threshold value, the electronic controller being configured to obtain the information related to the rotational speed of the wheel from a detector, and
the electronic controller controlling the vehicle component in accordance with the varied amount in a predetermined state that includes least one of a state in which the detector is not configured by a predetermined detector and a state in which the detector is defective.

18. A control device for a human-powered vehicle, the control device comprising:
an electronic controller configured to obtain information related to a rotational speed of an input rotational shaft of the human-powered vehicle and information related to a rotational speed of a wheel of the human-powered vehicle to control a vehicle component of the human-powered vehicle in accordance with a varied amount of the rotational speed of the input rotational shaft and a varied amount of the rotational speed of the wheel in a state in which a human driving force that is applied to the human-powered vehicle is greater than or equal to a predetermined threshold value,
the electronic controller being configured to further obtain at least one of first information related to a first ratio of the rotational speed of the wheel to the rotational speed of the input rotational shaft and second information related to a second ratio of the rotational speed of the input rotational shaft to the rotational speed of the wheel to control the vehicle component in accordance with the varied amount of the rotational speed of the input rotational shaft, the varied amount of the rotational speed of the wheel, and at least one of the first ratio and the second ratio in a state in which the human driving force is greater than or equal to the predetermined threshold value.

19. The control device according to claim 18, wherein
the vehicle component includes a motor configured to apply a propulsion force to the human-powered vehicle, and
the electronic controller is configured to limit output of the motor upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

20. The control device according to claim 18, wherein
the vehicle component includes a motor configured to apply a propulsion force to the human-powered vehicle, and
the electronic controller is configured to decrease an assist ratio of an assist force that is produced by the motor to a human driving force that is input to the human-powered vehicle upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

21. The control device according to claim 18, wherein
the vehicle component includes a motor configured to apply a propulsion force to the Human-powered vehicle, and
the electronic controller is configured to stop the motor upon determining a difference of a varied amount of a first value obtained by multiplying the rotational speed of the input rotational shaft by the first ratio and a varied amount of the rotational speed of the wheel is greater than or equal to a first difference or a difference of a varied amount of the rotational speed of the input rotational shaft and a varied amount of a second value obtained by dividing the rotational speed of the wheel by the first ratio is greater than or equal to a second difference.

22. The control device according to claim 18, wherein
the vehicle component includes a motor configured to apply a propulsion force to the human-powered vehicle, and
the electronic controller is configured to limit output of the motor upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

23. The control device according to claim 18, wherein
the vehicle component includes a motor configured to apply a propulsion force to the human-powered vehicle, and
the electronic controller is configured to decrease an assist ratio of an assist force that is produced by the motor to a human driving force that is input to the human-powered vehicle upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

24. The control device according to claim 18, wherein
the vehicle component includes a motor configured to apply a propulsion force to the human-powered vehicle, and
the electronic controller is configured to stop the motor upon determining a difference of a varied amount of a third value obtained by dividing the rotational speed of the input rotational shaft by the second ratio and a varied amount of the rotational speed of the wheel is greater than or equal to a fifth difference or a difference of a varied amount of the rotational speed of the input rotational shaft and a varied amount of a fourth value obtained by multiplying the rotational speed of the wheel by the second ratio is greater than or equal to a sixth difference.

25. The control device according to claim 18, wherein
the vehicle component includes a display, and
the electronic controller is configured to output information to the display to show predetermined display information on the display in accordance with a varied amount of the rotational speed of the input rotational shaft, a varied amount of the rotational speed of the wheel, and at least one of the first ratio and the second ratio in a state in which the human driving force is greater than or equal to the predetermined threshold value.

* * * * *